(12) United States Patent
Tokuchi

(10) Patent No.: US 12,067,590 B2
(45) Date of Patent: Aug. 20, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 914 days.

(21) Appl. No.: 15/930,541

(22) Filed: May 13, 2020

(65) Prior Publication Data

US 2021/0158387 A1 May 27, 2021

(51) Int. Cl.
*G06Q 30/02* (2023.01)
*G02B 30/56* (2020.01)
*G06Q 30/0242* (2023.01)
*G06Q 30/0251* (2023.01)
*G06Q 30/0272* (2023.01)

(52) U.S. Cl.
CPC ......... *G06Q 30/0242* (2013.01); *G02B 30/56* (2020.01); *G06Q 30/0252* (2013.01); *G06Q 30/0272* (2013.01)

(58) Field of Classification Search
CPC .......... G06Q 30/0242; G06Q 30/0252; G06Q 30/0272; G02B 30/56
See application file for complete search history.

(56) References Cited

U.S. PATENT DOCUMENTS

| | | | | |
|---|---|---|---|---|
| 6,876,974 B1* | 4/2005 | Marsh | ................ | G06Q 30/0245 705/26.1 |
| 8,995,968 B2* | 3/2015 | Ramer | ............... | G06Q 30/0275 455/414.1 |
| 11,188,945 B2* | 11/2021 | Hiramatsu | .............. | G09F 21/00 |
| 2006/0212348 A1* | 9/2006 | Lambert | ................. | H04L 67/06 705/14.52 |
| 2010/0042485 A1* | 2/2010 | Wang | ................. | G06Q 30/0252 705/14.5 |
| 2010/0073751 A1* | 3/2010 | Maekawa | .............. | G02B 5/124 359/203.1 |
| 2014/0089097 A1* | 3/2014 | Byun | ................. | G06Q 30/0267 705/14.64 |
| 2015/0142571 A1* | 5/2015 | Moczydlowski | .. | G06Q 30/0261 705/14.58 |
| 2016/0253703 A1* | 9/2016 | Lee | ..................... | G06Q 30/0256 705/14.54 |
| 2021/0182913 A1* | 6/2021 | Hwang | .............. | G06F 16/9017 |

FOREIGN PATENT DOCUMENTS

| | | |
|---|---|---|
| JP | 2009-229905 A | 10/2009 |
| JP | 2016-095634 A | 5/2016 |
| WO | 2017/125984 A1 | 7/2017 |

OTHER PUBLICATIONS

J. Mahfud and T. Matsumaru, "Interactive aerial projection of 3D hologram object," 2016 IEEE International Conference on Robotics and Biomimetics (ROBIO), Qingdao, China, 2016, pp. 1930-1935, doi: 10.1109/ROBIO.2016.7866611. (Year: 2016).*

* cited by examiner

*Primary Examiner* — Gautam Ubale
*Assistant Examiner* — Christopher C Busch
(74) *Attorney, Agent, or Firm* — Oliff PLC

(57) ABSTRACT

An information processing apparatus includes a processor configured to control the position of an advertisement image in the depth direction in accordance with the priority of the advertisement image, the advertisement image being an image of an advertisement formed in the air.

21 Claims, 23 Drawing Sheets

FIG. 2

| | PRIORITY | PLACEMENT START DATE/TIME | PLACEMENT END DATE/TIME | CONTRACT RANK | TARGET AUDIENCE | SPECIAL PROVISION | POSITION IN DEPTH DIRECTION | POSITION IN HEIGHT DIRECTION | SIZE |
|---|---|---|---|---|---|---|---|---|---|
| AD A | | 11/20/2019 ... | 12/20/2019 ... | A | ADULTS | | | | |
| AD B | | 11/21/2019 ... | 12/31/2019 ... | B | MALES | | | | |
| AD C | | 11/22/2019 ... | 03/31/2020 ... | A | FEMALES | | | | |
| AD D | A | 11/25/2019 ... | 12/24/2019 ... | A | CHILDREN | YES | | | |
| AD E | | 11/28/2019 ... | 12/13/2019 ... | C | AGED 50 AND OLDER | | | | |
| ... | | | | | | | | | |
| CONTENT ITEM AA | A | 12/1/2019 ... | 12/10/2019 ... | | ALL | | | | |
| CONTENT ITEM AB | A | 12/1/2019 ... | 12/7/2019 ... | | GROWN PERSONS | | | | |
| ... | | | | | | | | | |

RELATIVE PRIORITY RANKS: A > B

RELATIVE PRIORITY RANKS: A > B

RELATIVE PRIORITY RANKS: A > B

RELATIVE PRIORITY RANKS: A > B

FIG. 21
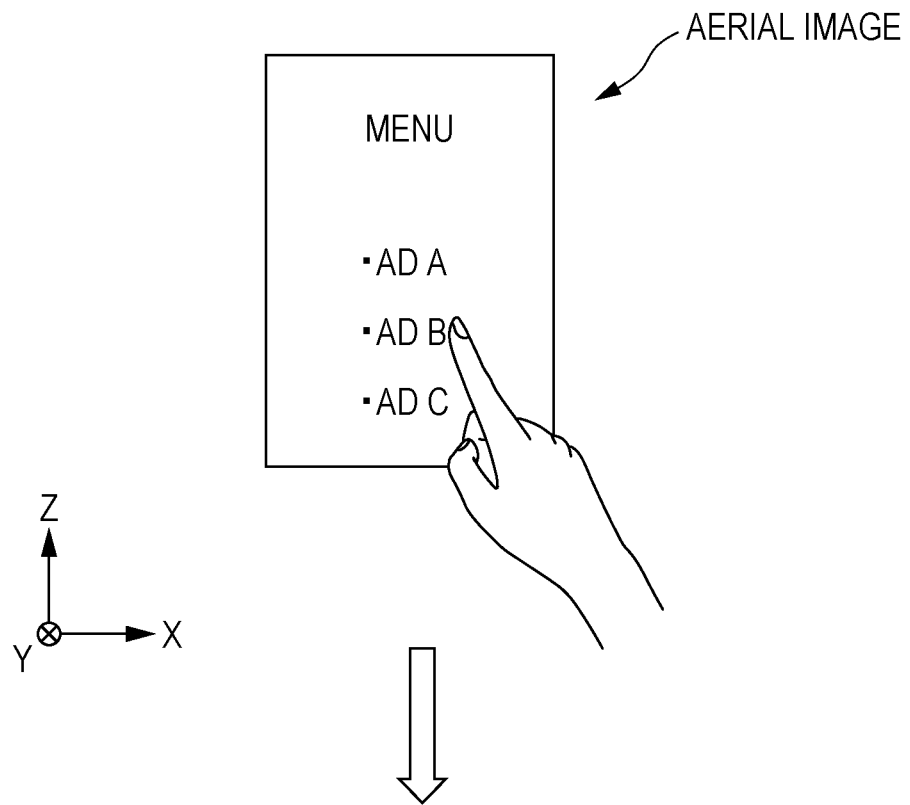
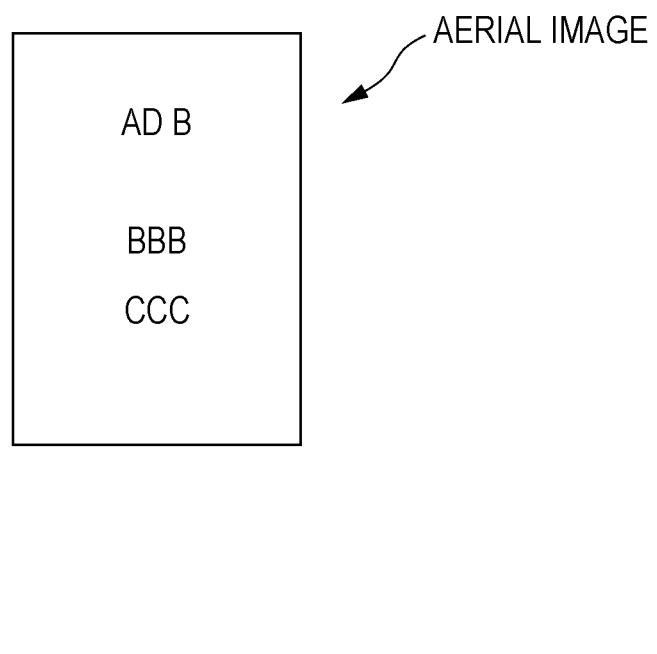

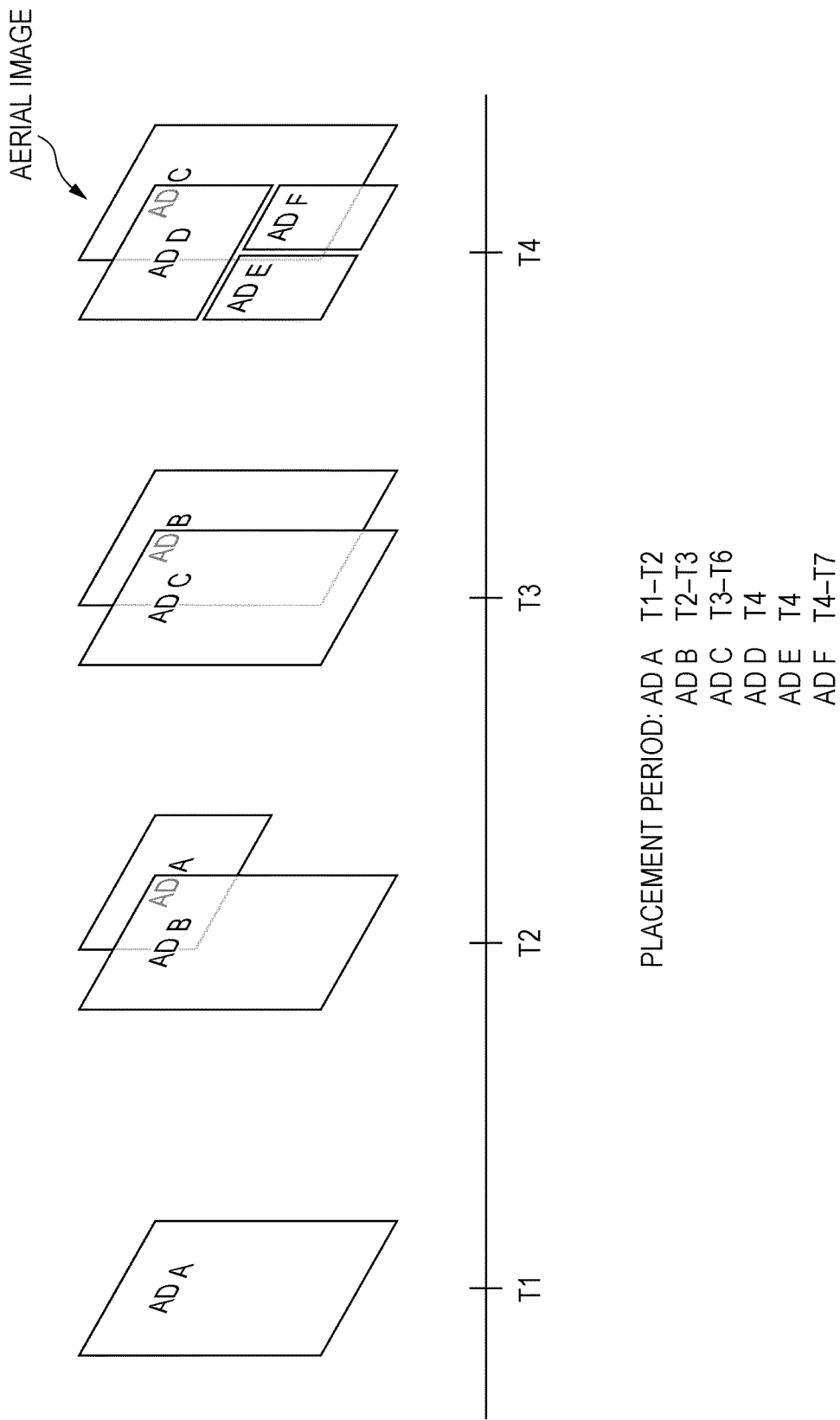

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-213623 filed Nov. 26, 2019.

BACKGROUND

(i) Technical Field

The present disclosure relates to an information processing apparatus, and a non-transitory computer readable medium.

(ii) Related Art

To date, various techniques have been proposed to form images in the air. Some of these techniques are now being used in fields such as advertising and gaming (see, for example, Japanese Unexamined Patent Application Publication No. 2009-229905).

Advertising needs to be fresh to be effective. Thus, an advertisement is replaced by another advertisement once its placement period has expired. An advertisement continues to be placed at the same position during its placement period. The same is true for advertisement images formed in the air.

SUMMARY

Aspects of non-limiting embodiments of the present disclosure relate to providing advertisements in diverse ways compared with when advertisements are formed at fixed positions in the air during their placement period.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to control the position of an advertisement image in the depth direction in accordance with the priority of the advertisement image, the advertisement image being an image of an advertisement formed in the air.

BRIEF DESCRIPTION OF THE DRAWINGS

Exemplary embodiment of the present disclosure will be described in detail based on the following figures, wherein:

FIG. 2 illustrates an exemplary schedule related to the placement of advertisements formed in the air as aerial images;

FIGS. 5A to 5C each illustrate an example of how an aerial image used for advertising is moved in the depth direction during its placement period, of which FIG. 5A illustrates Position P1 where the aerial image is located in the depth direction on the placement start day, FIG. 5B illustrates Position P2 where the aerial image is located in the depth direction on the day when one-half of the placement period has elapsed, and FIG. 5C illustrates Position P3 where the aerial image is located in the depth direction on the previous day of the placement end day;

FIGS. 8A to 8C each illustrate another example of how aerial images are positioned relative to each other if plural advertisements with the same priority rank are formed in the same space, of which FIG. 8A illustrates an example in which the aerial images are formed side by side in the horizontal direction, FIG. 8B illustrates an example in which the aerial images are each individually changed in size and formed at the same position, and FIG. 8C illustrates an example in which the aerial images are formed with a time difference therebetween:

FIGS. 11A and 11B each illustrate an exemplary process performed if placement of a new advertisement is to be started, of which FIG. 11A illustrates a state before placement of Advertisement A as a new advertisement is started, and FIG. 11B illustrates a state after placement of Advertisement A as a new advertisement is started;

FIGS. 12A and 12B each illustrate another exemplary process performed if placement of a new advertisement is to be started, of which FIG. 12A illustrates a state before placement of Advertisement A as a new advertisement is started, and FIG. 12B illustrates a state after placement of Advertisement A as a new advertisement is started;

FIGS. 14A and 14B each illustrate another example of how to position aerial images formed at plural positions in the depth direction, of which FIG. 14A illustrates how the aerial images are positioned relative to each other if the distance L1 between a person and Position P1 is greater than a threshold L0, and FIG. 14B illustrates how the aerial images are positioned relative to each other if the distance L2 between the person and Position P1 is less than the threshold L0;

FIGS. 15A and 15B each illustrate another example of how to position aerial images formed at plural positions in the depth direction, of which FIG. 15A illustrates how the aerial images are positioned relative to each other if the distance L1 between a person and Position P1 is greater than the threshold L0, and FIG. 15B illustrates how the aerial images are positioned relative to each other if the distance L2 between the person and Position P1 is less than the threshold L0;

FIGS. 16A and 16B each illustrate another example of how to position aerial images formed at plural positions in the depth direction, of which FIG. 16A illustrates an example in which a person is not looking in the direction of an aerial image, and FIG. 16B illustrates an example in which the person is looking in the direction of the aerial image;

FIGS. 17A and 17B each illustrate an example of how to position aerial images that are formed at plural positions in the depth direction and can be observed from both the front and back sides, of which FIG. 17A illustrates how the aerial images are formed if the distance between Person A and Position P1 is less than the distance between Person B and Position P2, and FIG. 17B illustrates how the aerial images are formed if the distance between Person B and Position P2 is less than the distance between Person A and Position P1;

FIGS. 18A and 18B each illustrate an example in which what an advertisement formed as an aerial image advertises is changed by using, as information that is given precedence over priority, an attribute of a person who sees the aerial image, of which FIG. 18A illustrates an example in which the person is a grown person, and FIG. 18B illustrates an example in which such persons are children;

FIG. 21 illustrates how an aerial image changes in response to receiving a person's operation on a menu screen;

FIG. 22 illustrates an example of how aerial images are formed by using the above-mentioned examples in a combined manner;

FIGS. 23A to 23C each illustrate the relationship between whether an aerial image has been seen by a person present near the aerial image, and where the aerial image is formed, of which FIG. 23A illustrates a state in which the person is present near an aerial image but has not seen the aerial image, FIG. 23B illustrates a state in which the person has seen the aerial image while moving, and FIG. 23C illustrates a state in which the person continues moving even after confirmed to have seen the aerial image; and FIGS. 24A and 24B each illustrate how an aerial image corresponding to a content item, and an aerial image corresponding to an advertisement are positioned relative to each other, of which FIG. 24A illustrates an exemplary case in which the aerial image corresponding to the content item and the aerial image corresponding to the advertisement are formed simultaneously, and FIG. 24B illustrates an exemplary case in which the formation of the aerial image corresponding to the content item is stopped.

DETAILED DESCRIPTION

An exemplary embodiment of the present disclosure will be described below with reference to the drawings.

EXEMPLARY EMBODIMENT

System Configuration

Figure 1:
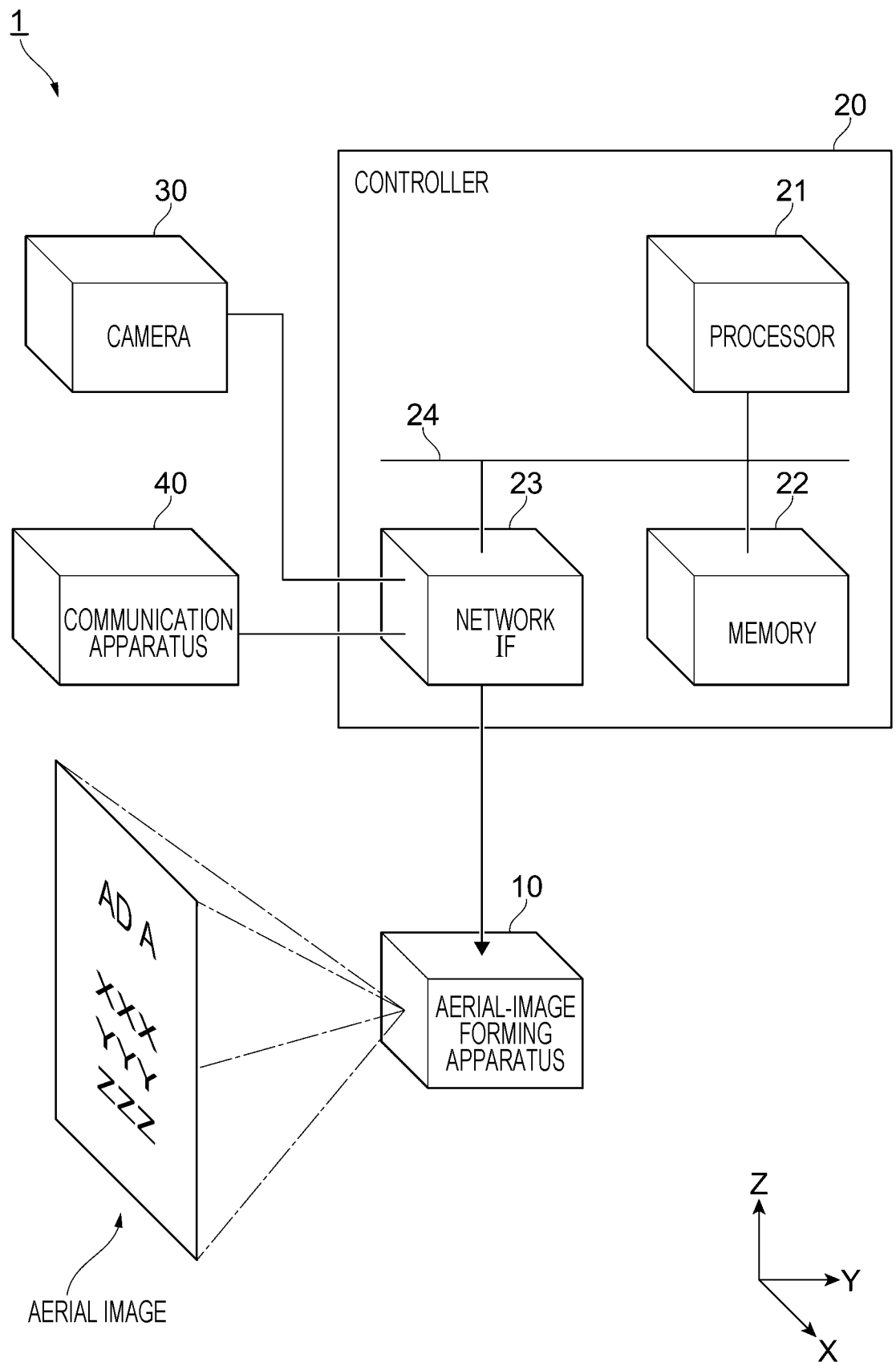
FIG. 1 illustrates an exemplary configuration of an information processing system according to an exemplary embodiment.

FIG. 1 illustrates an exemplary configuration of an information processing system 1 according to an exemplary embodiment.

The information processing system 1 illustrated in FIG. 1 includes an aerial-image forming apparatus 10, a controller 20, a camera 30, and a communication apparatus 40. The aerial-image forming apparatus 10 forms an image (to be also referred to as "aerial image" hereinafter) such that the image floats up in the air. The controller 20 controls the aerial-image forming apparatus 10 or other components. The camera 30 captures an image of the area in the vicinity of an aerial image. The communication apparatus 40 communicates with an information terminal carried by a person present in the vicinity of an aerial image.

The term "person" as used in the exemplary embodiment refers to both a person observing an aerial image and a person not observing an aerial image.

In the exemplary embodiment, an aerial image is used to present an advertisement or other information. In the exemplary embodiment, an advertisement is used to draw attention to a product, a service, or other information. In the following description of the exemplary embodiment, an aerial image used for advertising will be also referred to as an advertisement image.

An aerial image may be of any shape, and may have a solid or planar shape. Examples of solid shapes include a sphere, a polyhedron, a cylinder or other such curved solid, and the shape of an object such as a person, an animal, an electrical appliance, or a fruit.

Examples of planar shapes include a circle, a polygon, and the shape of an object such as a person, an animal, an electrical appliance, or a fruit. Examples of planar shapes also include a curved surface. The terms "person" and "animal" as used herein may include imaginary characters or creatures.

An aerial image formed in the air may not necessarily be an image defining the surfaces of a solid but may be made up of an image defining the surfaces of a solid and an image corresponding to its interior. In other words, an aerial image may be represented by voxel data.

The aerial image according to the exemplary embodiment may be a static image or a moving image.

The aerial-image forming apparatus 10 according to the exemplary embodiment is an apparatus that directly forms an aerial image in the air. Various methods for forming an aerial image have already been proposed, and some of these methods have been put into practical use.

Examples of methods for forming an aerial image include use of a half mirror, use of a beam splitter, use of a minute mirror array, use of a minute lens array, use of a parallax barrier, and use of plasma emission. An aerial image generated by such a method allows a person to pass through the aerial image.

An example of the aerial-image forming apparatus 10 that generates an aerial image that does not allow a person to pass therethrough is a projector that projects an image onto a screen existing in the real space. Other examples of the aerial-image forming apparatus 10 include an apparatus that moves an array of light-emitting elements in the real space at high speed, and uses the resulting persistence of vision effect to allow a person to see an aerial image.

The controller 20 includes a processor 21, a memory 22, a network interface (IF) 23, and a signal line 24. The processor 21 executes a program to execute a process such as generation of aerial image data or a search. The memory 22 stores information such as a program or various data. The network IF 23 is used to achieve communication with the external environment. The signal line 24 is a bus or other such signal line that connects the above-mentioned components of the controller 20. The controller 20 is an example of an information processing apparatus.

The processor 21 is, for example, a CPU. The memory 22 includes, for example, a read only memory (ROM) in which a basic input output system (BIOS) or other information is stored, a random access memory (RAN) used as a work area, and a hard disk device in which a basic program, an application program, or other information is stored.

It is to be noted, however, that the above description does not preclude inclusion of the ROM or RAM in a portion of the processor 21. The processor 21 and the memory 22 constitute a computer.

The camera 30 is used to capture an image of a person present in the vicinity of an aerial image. In the exemplary embodiment, the camera 30 is used to acquire information that can be determined or estimated from information about the appearance of a person, such as sex or age group. The camera 30 is also used to acquire information such as the direction of person's movement or the direction of person's gaze. Processes such as the determination or estimation of sex, age group, or other information, the acquisition of the direction of person's movement, and the acquisition of the direction of person's gaze are executed by the processor 21.

The communication apparatus 40 is used to communicate with a communication terminal carried by a person to thereby acquire information such as the relative positions of the person and an aerial image, and an attribute of the person. Examples of person's attributes include information associated with the account of the person's communication terminal, such as sex, age, job category, and annual income. Examples of the communication apparatus 40 include local area network (LAN) modules, Bluetooth (registered trademark) modules, and modules of 3G, 4G, and 5G mobile communications standards.

Exemplary Schedule Related to Placement of Advertisements FIG. 2 illustrates an exemplary schedule related to the placement of advertisements formed in the air as aerial images.

The schedule illustrated in FIG. 2 includes information such as information received with respect to Advertisements A, B, C, D, and E and Content Items AA and AB managed separately from these advertisements, and information necessary for forming aerial images.

In the exemplary embodiment, examples of content items managed separately from advertisements include an advertisement menu screen, a floor map, notification of business hours, or other such still images or moving images managed separately from advertisements by a business operator that forms aerial images.

In the case of FIG. 2, each advertisement or content item is managed in accordance with the following information: priority, the date/time of start of placement (to be referred to as "placement start date/time" hereinafter), the date/time of end of placement (to be referred to as "placement end date/time" hereinafter), contract rank, target audience, special provision, the position in the depth direction, the position in the height direction, and size.

Priority in this case is used in determining the position or size at which an aerial image is to be formed in the air. In the exemplary embodiment, "A" represents the highest priority rank, followed by "B", "C", and then "D" in decreasing order of priority rank. Depending on the case, a priority rank is given in advance or is determined on an as-needed basis.

Further, depending on the case, a priority rank is fixed to a specific rank during the period of placement (to be referred to as "placement period" hereinafter) or is changed during the placement period.

FIG. 2 depicts Advertisement D, Content Item AA, and Content Item AB as exemplary items with a fixed priority rank. All of these items have the priority rank "A". In the exemplary embodiment, content items are given precedence over advertisements. Thus, the priority rank is set to "A" for content items. Advertisement D is given the contract rank "A", and also has a special provision ("Yes"). Thus, the priority rank of Advertisement D is fixed to "A" throughout the entire placement period.

The other advertisements, Advertisements A, B, C, and E, each have a priority rank that can vary during its placement period. For this reason, the Priority field for these advertisements is blank in the example illustrated in FIG. 2. During the placement period, some priority rank is stored as information also for each of Advertisements A, B, C, and E.

The term placement period as used herein refers to the period of time from the placement start date/time to the placement end date/time. In FIG. 2, times less than one day are not indicated in the Placement Start Date/Time field and the Placement End Date/Time field. However, in actuality, hours, minutes, and seconds are also indicated in these fields. It is to be noted, however, that advertisement placement may be managed by, for example, month, day, day of the week.

Contract Rank represents a priority rank related to an advertisement contract. In the exemplary embodiment, "A" represents the highest priority rank, followed by "B", "C", and then "D" in decreasing order of priority rank. The priority rank related to a contract depends on, for example, the conditions or agreement established at the time of contract conclusion.

Target Audience depends on the nature of the product or service to be advertised. In the exemplary embodiment, attributes such as adults, grown persons, children, age group, males, females, students, working professionals, occupation, and annual income are assumed as the attributes of the target audience.

Special Provision refers to a special condition or limitation set by an advertisement contract. Examples of such special conditions include conditions related to advertisement placement, conditions related to priority, and conditions related to the height or size at which an advertisement is to be placed.

Position in Depth Direction refers to where an aerial image to be is formed in the horizontal direction by the aerial-image forming apparatus 10 (see FIG. 1). In the exemplary embodiment, a location assumed to be the reference position used to see an aerial image is set for convenience, and a position in the direction of increasing linear distance from the reference position is defined as position in the depth direction. It is to be noted, however, that if there is a specific observer serving as a reference, the direction of increasing distance from the reference observer will be referred to as depth direction. The location assumed to be the position used to see an aerial image may be set as a range rather than a point.

Position in Height Direction refers to the height at which to position an advertisement if the advertisement is to be formed at a given position in the depth direction. Examples of positions in the height direction include entire plane, upper half, lower half, right-hand side, and left-hand side.

Size refers to the size of an advertisement formed as an aerial image.

In the case of FIG. 2, the Position in Depth Direction field, the Position in Height Direction field, and the Size field are all blank. This is because these pieces of information vary not only with priority rank but also in relation to other advertisements. It is to be noted, however, that these pieces of information may be also fixed.

In the case of FIG. 2, Advertisement A has the contract rank "A", and is intended to be seen by adults. Advertisement B has the contract rank "B", and is intended to be seen by males. Advertisement C has the contract rank "A", and is intended to be seen by females. Advertisement D has the contract rank "A", and is intended to be seen by children. Advertisement D has a special provision such that its priority rank is set to "A" during the contract period. It is to be noted, however, that the specific priority rank varies with each special provision. Advertisement E has the contract rank "C", and is intended to be seen by those aged 50 and older. Content Item AA has the priority rank "A". For Content Item AA, the target audience is subject to no limitation and thus set to "All". Content Item AB has the priority rank A". Further, Content Item AB is intended to be seen by grown persons.

Figure 3:
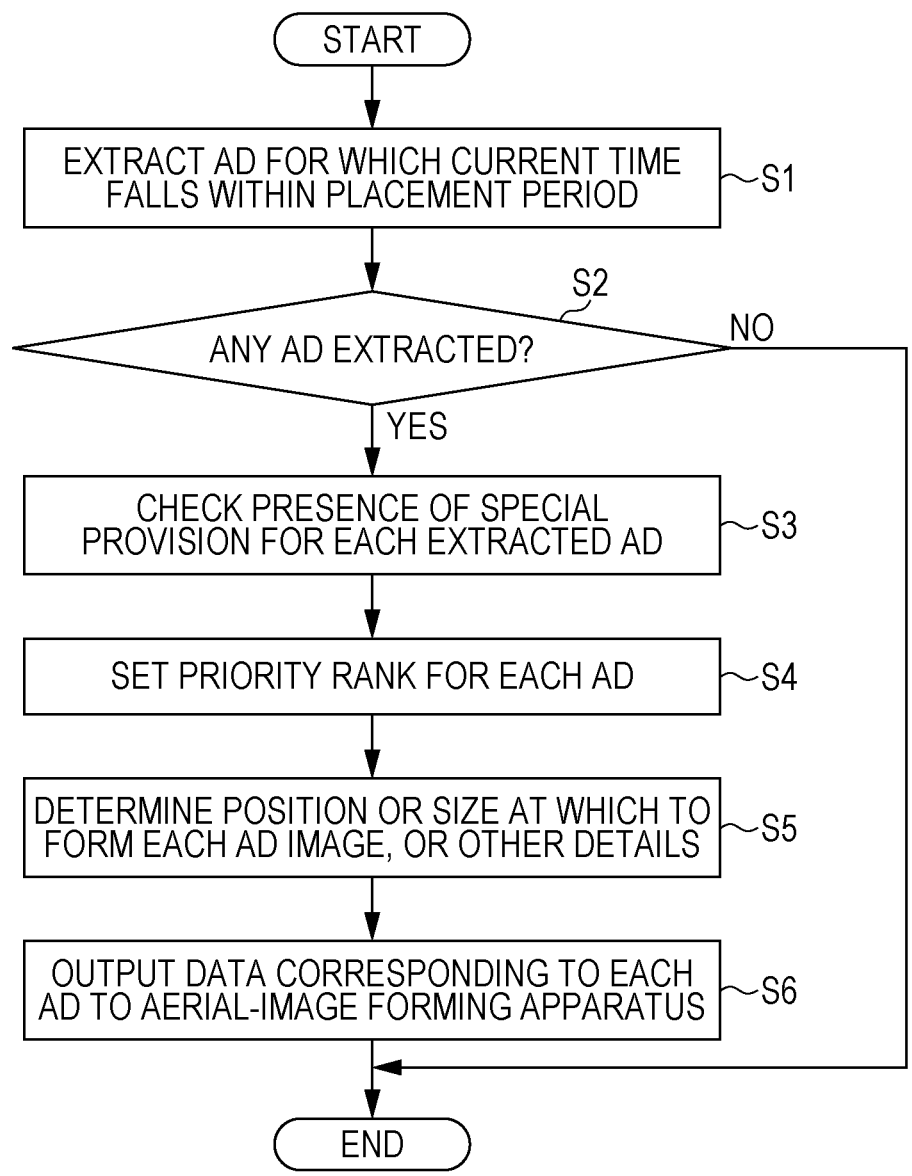
FIG. 3 is a flowchart illustrating an exemplary process used in outputting an advertisement as an aerial image.

Outputting of Advertisement as Aerial Image FIG. 3 is a flowchart illustrating an exemplary process used in outputting an advertisement as an aerial image. The process illustrated in FIG. 3 is implemented through execution of a program by the processor 21 (see FIG. 1).

First, the processor 21 accesses the memory 22 (see FIG. 1) to extract any advertisement for which the current time falls within its placement period (step 1). In the exemplary embodiment, the above-mentioned process, which extracts any advertisement for which the current time falls within its placement period, is performed for all the advertisements registered in the schedule illustrated in FIG. 2. For example, the processor 21 determines, for each individual advertisement, whether the current time falls within the placement period of the advertisement, and extracts any advertisement for which the current time falls within its placement period. A flag may be attached to such an extracted advertisement to distinguish the advertisement from other advertisements not extracted. Further, a data folder or data table collecting only extracted advertisements may be generated.

When the extraction process has been performed for all the advertisements registered in the schedule, the processor 21 determines whether any advertisement has been extracted (step 2).

If the determination at step 2 is negative, this means that there is no advertisement to be formed. Thus, the processor 21 ends the current process, and prepares for when the process is performed next time.

If the determination at step 2 is affirmative, the processor 21 checks the presence of a special provision for each individual advertisement extracted (step 3). Such information about the presence of a special provision is used in, for example, setting a priority rank or setting, for example, where an aerial image is to be formed.

Then, the processor 21 sets a priority rank for each individual advertisement (step 4).

Figure 4:
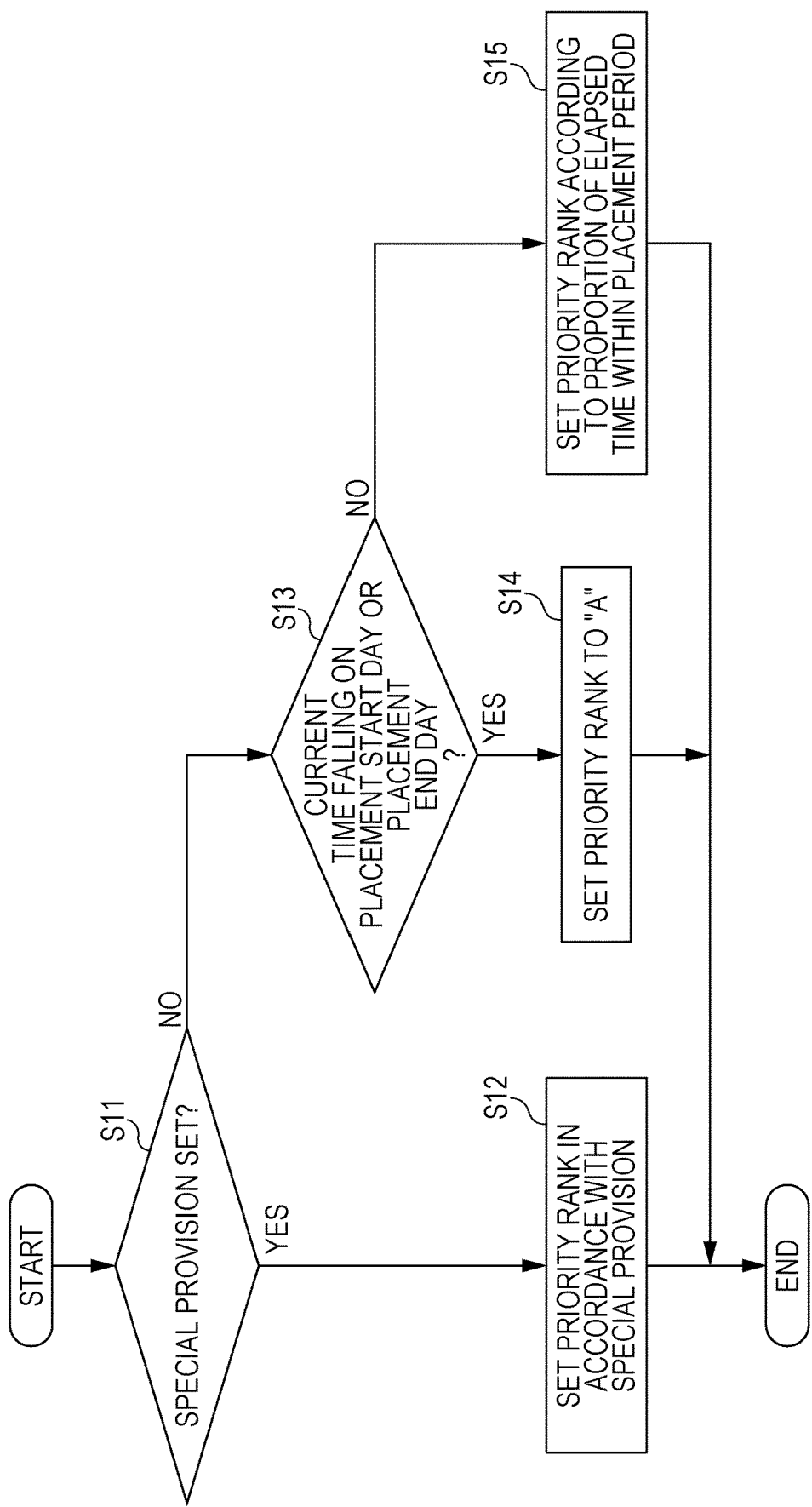
FIG. 4 is a flowchart illustrating an exemplary method used in the exemplary embodiment for setting a priority rank.

FIG. 4 is a flowchart illustrating an exemplary method used in the exemplary embodiment for setting a priority rank. As described above, the process illustrated in FIG. 4 is also implemented through execution of a program by the processor 21. The process illustrated in FIG. 4 is executed for each individual advertisement extracted at step 1 (see FIG. 3).

First, the processor 21 determines whether a special provision is set for an advertisement of interest (step 11). For this determination, for example, the result of step 3 (see FIG. 3) is used.

If the determination at step 11 is affirmative, the processor 21 sets a priority rank for the advertisement of interest in accordance with the special provision (step 12). Depending on the special provision, the priority rank is not necessarily set to "A" but set to, for example, "B" or "C".

If the determination at step 11 is negative, the processor 21 determines whether the current time is on the placement start day or the placement end day. In this case, the placement start date refers to the day when placement of an advertisement begins, and the placement end day refers to the day when placement of an advertisement ends.

The exemplary embodiment employs the rule that an advertisement be positioned at a prominent position on the placement start day and the placement end day. The term prominent as used herein means readily observable by people.

Thus, if the determination at step 13 is positive, the processor 21 sets the priority rank of the advertisement of interest to "A" (step 14).

If the determination at step 13 is negative, the processor 21 sets a priority rank in accordance with the proportion of elapsed time within the placement period (step 15). In the exemplary embodiment, with the entire placement period of each advertisement defined as 100%, the priority rank is set to decrease with increasing proportion of the time elapsed.

For example, provided that priority is ranked in four levels, if the proportion of elapsed time within the placement period is 10%, then the priority rank is set to "A". If, for example, the proportion of elapsed time within the placement period is 40%, the priority rank is set to "B". If, for example, the proportion of elapsed time within the placement period is 60%, the priority rank is set to "C". If, for example, the proportion of elapsed time within the placement period is 80%, the priority rank is set to "D".

The examples given above are only illustrative. The relationship between the proportion of elapsed time and the priority rank to be assigned may not necessarily be linear but may be non-linear.

The description now returns to FIG. 3. Once a priority rank is set for each individual advertisement, the processor 21 determines the position or size at which to form each advertisement image, or other details (step 5). Examples of positions in this case include not only the position in the depth direction but also the position in the height direction.

Subsequently, the processor 21 outputs data corresponding to each advertisement to the aerial-image forming apparatus 10 (see FIG. 1) (step 6). Then, the aerial-image forming apparatus 10 forms the received advertisement image in the air as an aerial image.

Example of Control

The following describes an example of control performed in forming, in the air, an aerial image used for advertising. In the exemplary embodiment, the position where an aerial image is to be formed in the depth direction is determined in accordance with the priority rank of the corresponding advertisement.

Example 1

Figure 5A:
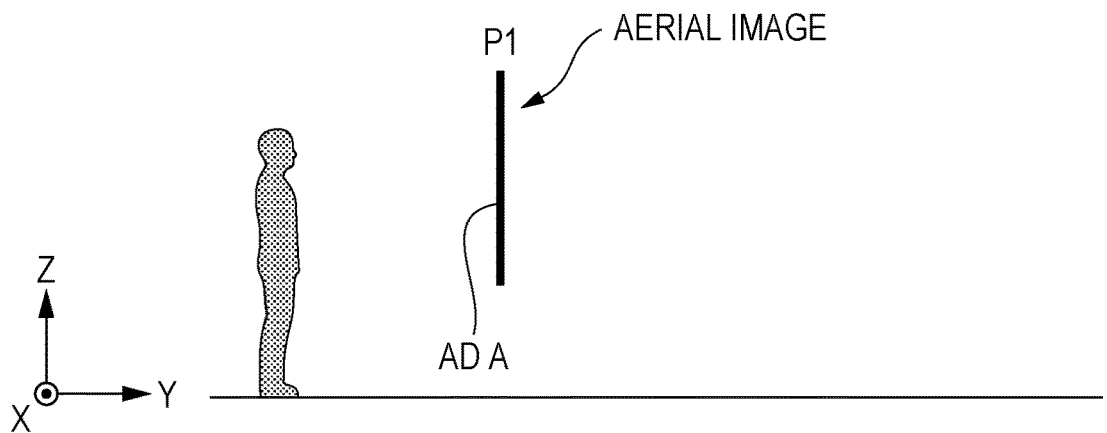
Figure 5B:
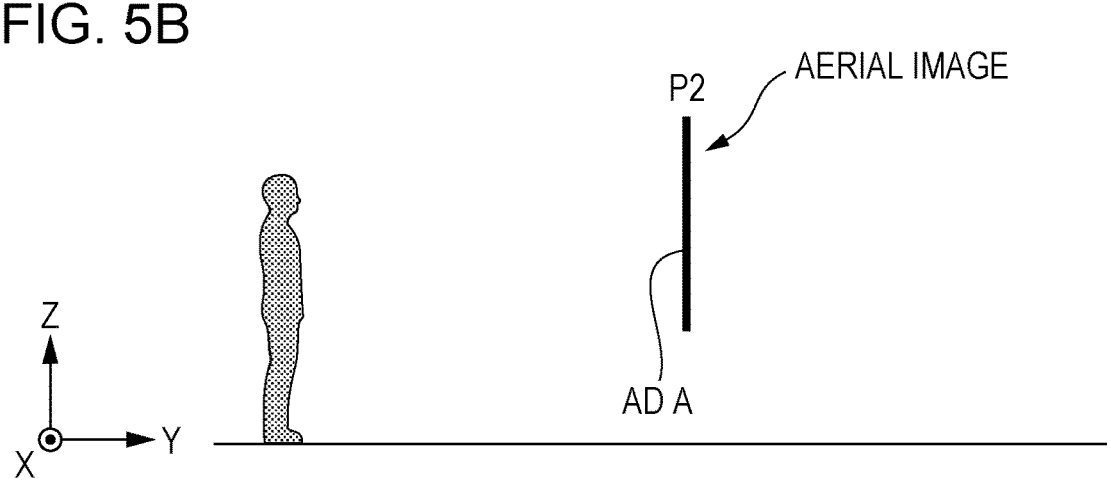
Figure 5C:

FIGS. 5A to 5C each illustrate an example of how an aerial image used for advertising is moved in the depth direction during its placement period. FIG. 5A illustrates Position P1 where the aerial image is located in the depth direction on the placement start day, FIG. 5B illustrates Position P2 where the aerial image is located in the depth direction on the day when one-half of the placement period has elapsed, and FIG. 5C illustrates Position P3 where the aerial image is located in the depth direction on the previous day of the placement end day.

The Y-axis in FIGS. 5A to 5C represents the depth direction.

FIGS. 5A to 5C each also depict an observer seeing (to be also referred to as "observing" hereinafter) Advertisement A. The position of the observer depicted in each of FIGS. 5A to 5C is the location assumed to be above-mentioned position used to see an aerial image. Of course, it is also conceivable that the actual position of the observer used to see an aerial image may in some cases be closer to or farther from Advertisement A than the above-mentioned position. Further, the observer may not necessarily face Advertisement A directly. It is also conceivable that the observer may in some cases observe Advertisement A obliquely.

As illustrated in FIGS. 5A to 5C, Position P1 is closest to the observer, Position P2 is next closest to the observer, Position P3 is farthest from the observer.

In the exemplary embodiment, the priority rank is set to "A" on the placement start day and the placement end day, and at other times, the priority rank is set based on the proportion of elapsed time within the placement period. In the case of FIGS. 5A to 5C, the priority rank is set to "B" on the day when one-half of the placement period has elapsed. The priority rank is set to "C" on the previous day of the placement end day. In the exemplary embodiment, for any day in between, the priority rank is set based on a predetermined rule.

In the case illustrated in FIGS. 5A to 5C, the position at which to form an aerial image corresponding to Advertisement A is controlled to be one of Positions P1 to P3 in accordance with a preset priority rank. That is, if the priority rank is "A", the aerial image is formed at Position P1 located at the shortest distance to the observer. If the priority rank is "B", the aerial image is formed at Position P2 located at an intermediate distance to the observer. If the priority rank is "C", the aerial image is formed at Position P3 located at the greatest distance to the observer.

In the case of FIGS. 5A to 5C, the priority rank to be set decreases as the proportion of elapsed time within the placement period increases, and as the priority rank decreases, the position at which to form the aerial image is moved to the far side. This represents the basic positional movement. In the exemplary embodiment, the position at which to form the aerial image is determined by its priority rank.

It is also possible to form the aerial image at Position P3 on the placement end day. However, in the exemplary embodiment, for reasons such as better advertising effect, the aerial image is moved to Position P1 on the nearest side on the placement end day. The aerial image may not necessarily be moved to Position P1 only on the placement end day. Plural days may be assigned as such days. For example, depending on the length of the placement period, it is also possible to start placing the aerial image at Position P1 one week before the placement end day. Further, the position at which to form the aerial image can be changed not in units of days but in units of hours, minutes, or seconds. These rules or agreement may vary for each business operator that forms an aerial image used for advertising.

In the case of FIGS. 5A to 5C, a single aerial image is formed in the air. Thus, the aerial image is formed in the air at the same size irrespective of its priority rank.

Example 2

Figure 6:
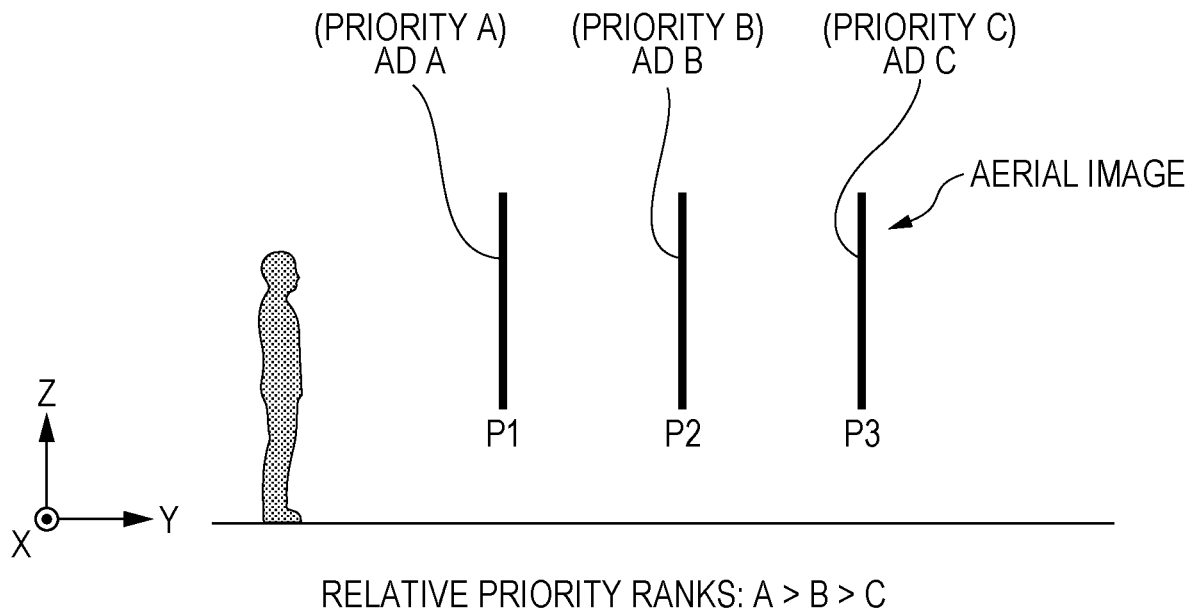
FIG. 6 illustrates how aerial images are positioned relative to each other if plural advertisements with different priority ranks are formed in the same space.

FIG. 6 illustrates how aerial images are positioned relative to each other if plural advertisements with different priority ranks are formed in the same space.

In the case of FIG. 6, the priority rank corresponding to Advertisement A is "A", the priority rank corresponding to Advertisement B is "B", and the priority rank corresponding to Advertisement C is "C".

If plural advertisements with different priority ranks are to be formed in the same space, the aerial image corresponding to Advertisement A with the highest priority rank is formed at Position P1, the aerial image corresponding to Advertisement B with the next highest priority rank is formed at Position P2, and the aerial image corresponding to Advertisement C with the lowest priority rank is formed at Position P3.

Example 3

Figure 7:
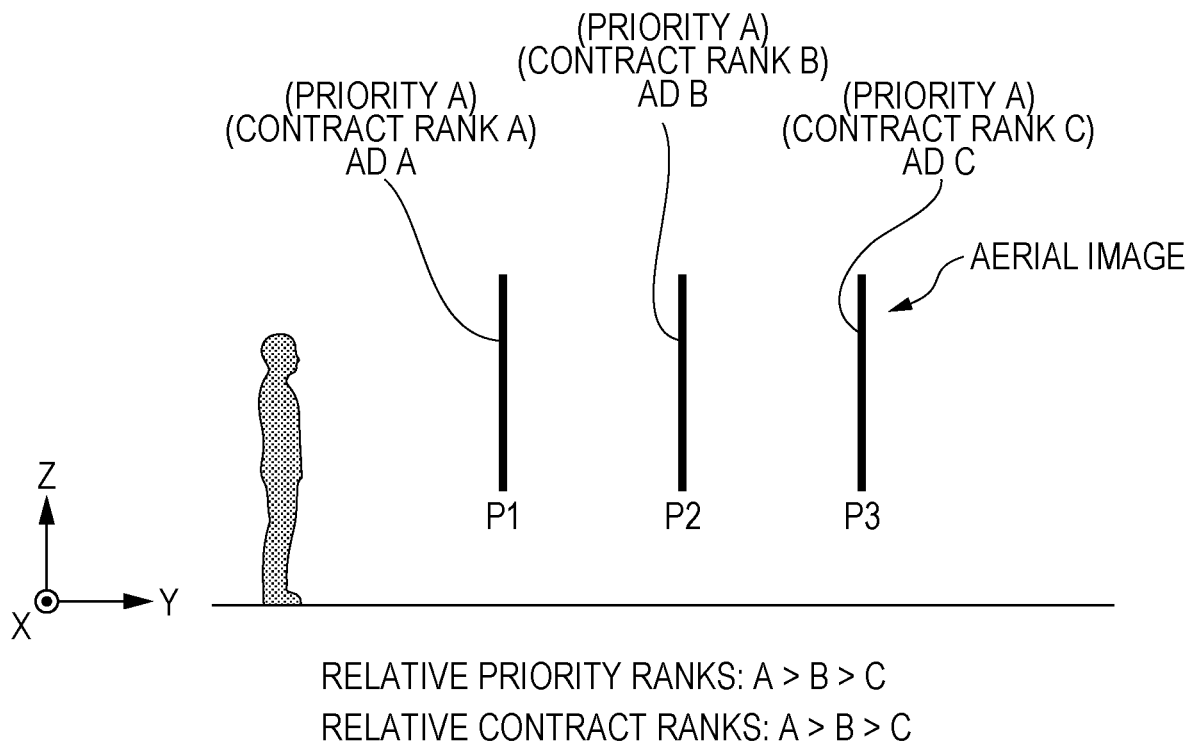
FIG. 7 illustrates how aerial images are positioned relative to each other if plural advertisements with the same priority rank but different contract ranks are formed in the same space.

FIG. 7 illustrates how aerial images are positioned relative to each other if plural advertisements with the same priority rank but different contract ranks are formed in the same space. As previously mentioned, the position at which to form an aerial image corresponding to an advertisement is basically determined by the priority rank of the advertisement. The following describes a case in which the position at which to form an aerial image is determined by also taking the contract rank into account.

In the case of FIG. 7, Advertisement A has the priority rank "A", and also has the contract rank "A". Advertisement B has the priority rank "A", but has the contract rank "B". Advertisement C has the priority rank "A", but has the contract rank "C".

In the case of FIG. 7, there is no difference in priority rank among the advertisements. Thus, the position at which to form each aerial image is determined by directing attention to the difference in contract rank.

In the example illustrated in FIG. 7, the aerial image corresponding to Advertisement A with the highest contract rank is formed at Position P1, the aerial image corresponding to Advertisement B with the next highest contract rank is formed at Position P2, and the aerial image corresponding to Advertisement C with the lowest contract rank is formed at Position P3.

Example 4

The following describes another example of how aerial images are positioned relative to each other if plural advertisements with the same priority rank are formed at once in the same space.

Figure 8A:
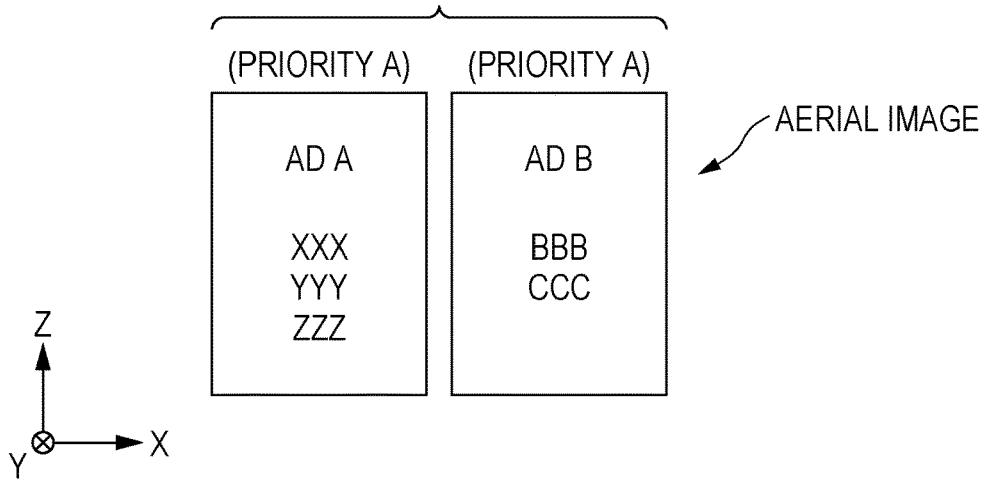
Figure 8B:
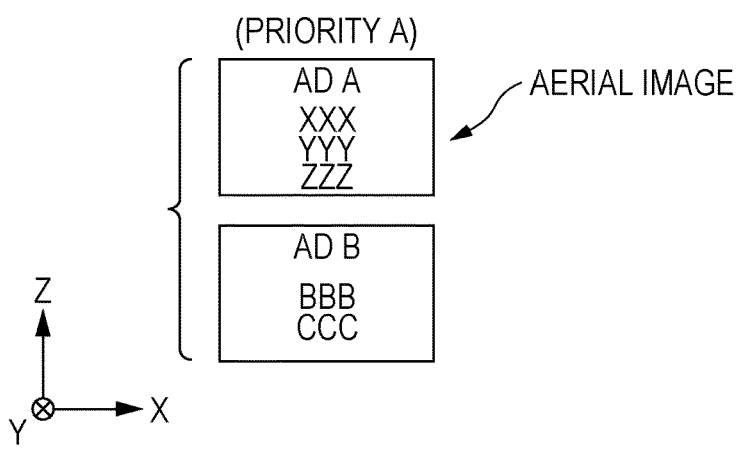
Figure 8C:
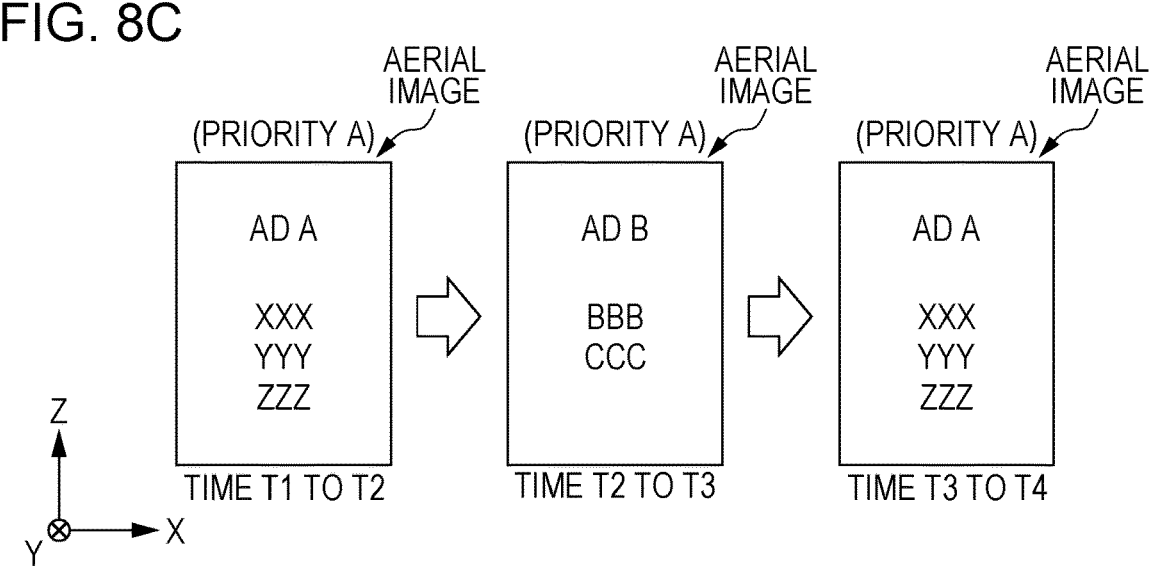

FIGS. 8A to 8C each illustrate another example of how aerial images are positioned relative to each other if plural advertisements with the same priority rank are formed in the same space. FIG. 8A illustrates an example in which the aerial images are formed side by side in the horizontal direction, FIG. 8B illustrates an example in which the aerial images are each individually changed in size and formed at the same position, and FIG. 8C illustrates an example in which the aerial images are formed with a time difference therebetween.

In the case of Example 3 mentioned above, the position at which to form each aerial image in the depth direction is varied in accordance with the contract rank. By contrast, in Example 4, all the aerial images are located at the same position in the depth direction.

For example, in the case of FIG. 8A, Advertisement A and Advertisement B both have the same priority rank "A". In the example illustrated in FIG. 8A, the aerial image corresponding to Advertisement A and the aerial image corresponding to Advertisement B are arranged at the same position, Position P1, in the depth direction side by side on the left- and right-hand sides as seen from the observer. If it is possible to arrange the aerial images in this way, each aerial image is presented to the observer at the same size as when the aerial image is formed alone in the air.

In this regard, arranging advertisement images as illustrated in FIG. 8A also necessitates preparation on the side of the information processing system 1 such as providing plural aerial-image forming apparatuses 10 (see FIG. 1). Further, in some cases, there may not be enough space for forming plural advertisements side by side on the left and right of each other.

In the example illustrated in FIG. 8B, an area corresponding to the size of an aerial image when the aerial image is formed alone in the air is split into two parts, with a reduced aerial image of Advertisement A being formed in one part and a reduced aerial image of Advertisement B being formed in the other part. Which one of Advertisements A and B is to be positioned in the upper part will be determined by previous agreement. For example, one of the two advertisements that has a special provision is positioned in the upper part, or one of the two advertisements with the higher contract rank is positioned in the upper part. It is to be noted, however, that the position of each advertisement may be determined randomly.

In the example illustrated in FIG. 8C, aerial images corresponding to plural advertisements are formed in the air with a time difference therebetween. As a result, the influence of spatial limitations or reduced advertisement sizes on visibility is reduced. In the example illustrated in FIG. 8C, between time T1 and time T2, only the aerial image of Advertisement A is formed in the air. Further, between time T2 and time T3, only the aerial image of Advertisement B is formed in the air, and between time T3 and time T4, only the aerial image of Advertisement A is formed in the air again.

Figure 9:
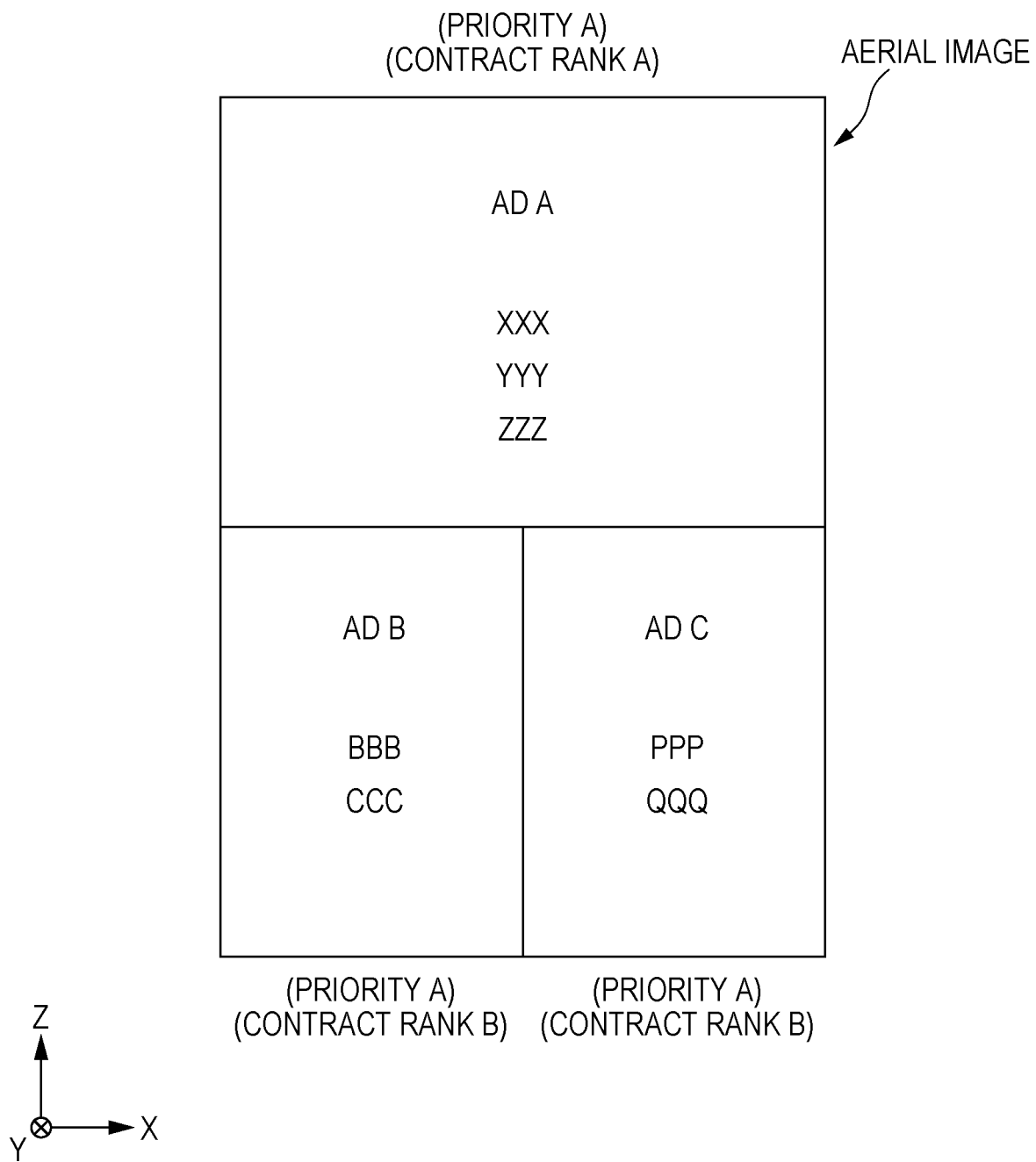
FIG. 9 illustrates another example of how aerial images are positioned relative to each other if plural advertisements with the same priority rank are formed in the same space.

FIG. 9 illustrates another example of how aerial images are positioned relative to each other if plural advertisements with the same priority rank are formed in the same space.

In the case of FIG. 9, there are three advertisements, all of which have the priority rank "A". However, these advertisements differ in contract rank. Advertisement A has the contract rank "A", whereas Advertisements B and C have the contract rank "B".

Thus, in the example illustrated in FIG. 9, the aerial image of Advertisement A is positioned in the upper part, and the respective aerial images of Advertisements B and C with a comparatively lower contract rank are positioned in the lower part. In this case, Advertisements B and C have the same contract rank. Accordingly, the lower area is divided into two parts, and the aerial image of Advertisement B is positioned at the left-hand side in FIG. 9 and the aerial image of Advertisement C is positioned at the right-hand side in FIG. 9.

As with the previously mentioned example, the respective aerial images of Advertisements A, B, and C may be formed sequentially with a time difference therebetween.

Example 5

Figure 10:
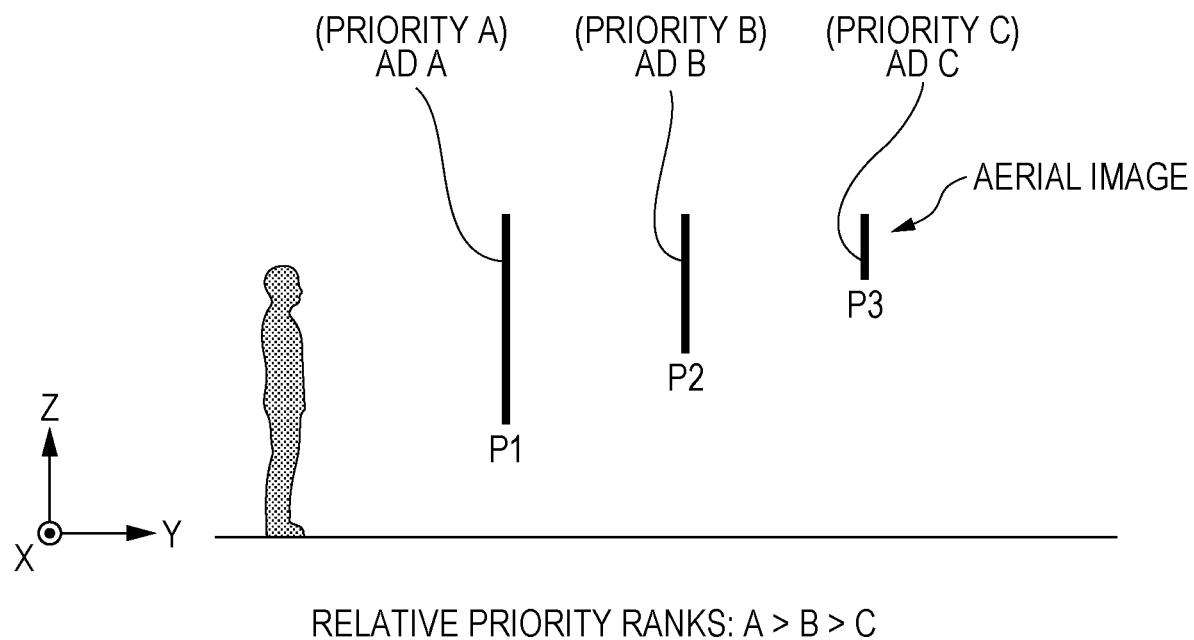
FIG. 10 illustrates an example in which each aerial image is changed not only in its position in the depth direction but also in size in accordance with its priority.

FIG. 10 illustrates an example in which each aerial image is changed not only in its position in the depth direction but also in size in accordance with its priority.

In the case of Example 2 mentioned above, although the position where each aerial image is formed in the depth direction is changed in accordance with its priority rank, each aerial image formed has the same size.

By contrast, in the example illustrated in FIG. 10, each aerial image is changed in size in accordance with its priority rank. Specifically, the aerial image of Advertisement A with the priority rank "A" is formed at Position P1 at the same size as when formed alone. The aerial image of Advertisement B with the priority rank "B" is formed at Position P2 at a smaller size than when the aerial image is formed alone. The aerial image of Advertisement C with the lowest priority rank "C" is formed at Position P3 at an even smaller size than the aerial image of Advertisement B.

Thus, each aerial image to be formed is changed not only in its position in the depth direction but also in size as illustrated in FIG. 10. This makes an advertisement with a higher priority rank more prominent.

Example 6

Figure 11A:
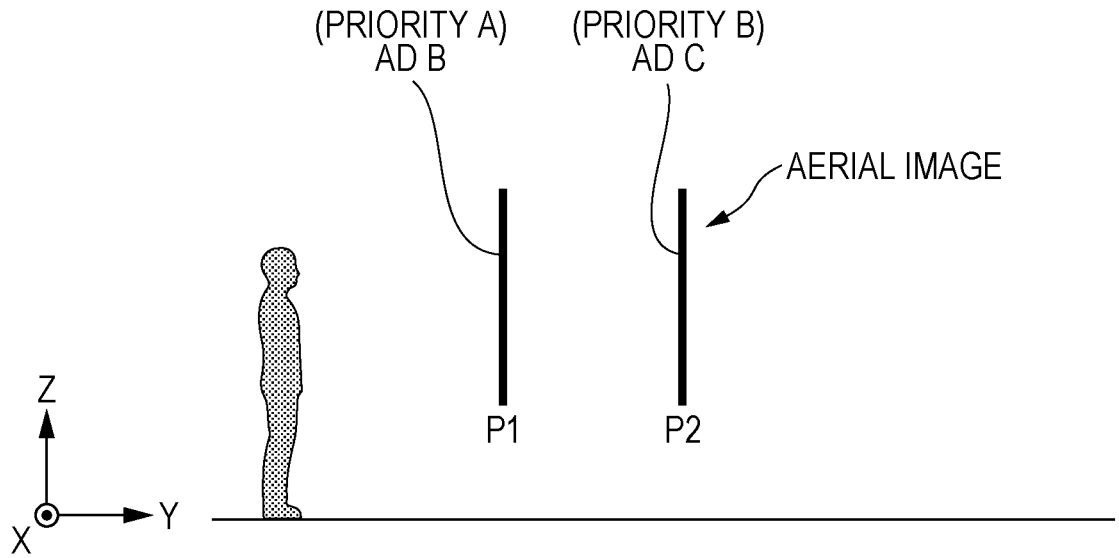
Figure 11B:
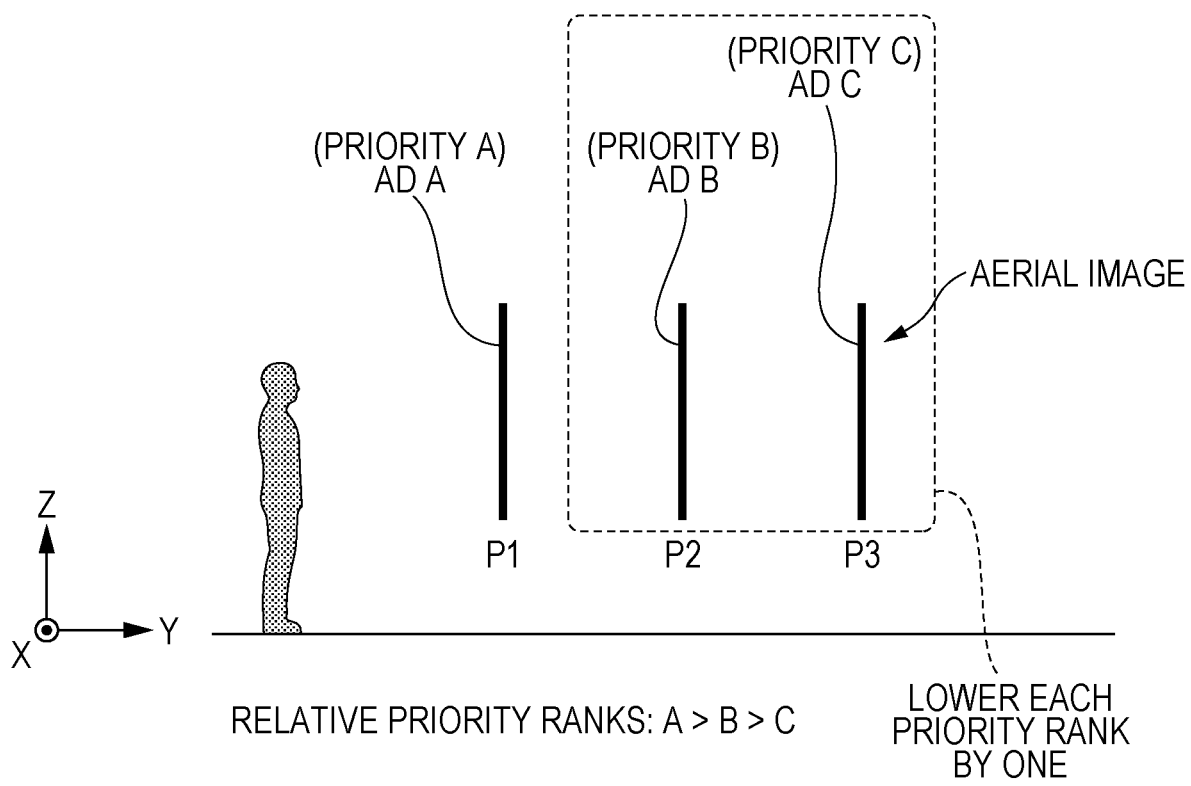

FIGS. 11A and 11B each illustrate an exemplary process performed if placement of a new advertisement is to be started. FIG. 11A illustrates a state before placement of Advertisement A as a new advertisement is started, and FIG. 11B illustrates a state after placement of Advertisement A as a new advertisement is started.

In the examples above, a priority is set for each individual advertisement based on how much time has elapsed relative to the overall placement period. In this regard, however, cases are also conceivable where it is desired to make a new advertisement prominent. Accordingly, Example 6 employs a process in which if placement of a new advertisement is started, the priority ranks of other advertisements are forced to be lowered.

Specifically, a case is now considered in which until immediately before placement of Advertisement A as a new advertisement is started, the aerial image of Advertisement B with the priority rank "A" is formed at Position P1, and the aerial image of Advertisement C with the priority rank "B" is formed at Position P2.

If an aerial image corresponding to a new advertisement, Advertisement A, is to be formed in this state, Advertisement A has the priority rank "A", and thus the aerial image corresponding to Advertisement A and the aerial image corresponding to Advertisement B are formed at Position P1. In this case, although these aerial images may be formed in the manner as illustrated in FIGS. 8A to 8C, from the viewpoint of making new Advertisement A prominent, it is desirable that only the aerial image corresponding to Advertisement A be formed alone at Position P1 closest to the observer.

Accordingly, in the case of FIGS. 11A and 11B, the priority rank is lowered by one for each of Advertisements B and C while the priority rank is kept unchanged at "A" for Advertisement A whose placement is to be newly started. This state corresponds to FIG. 11B.

In the case of FIG. 11B, the priority rank of Advertisement B is changed from the previous rank "A" to "B", and the priority rank of Advertisement C is changed from the previous rank "B" to "C". Due to the changes in priority rank, Advertisement A is now the only advertisement with the priority rank "A", Advertisement B is now the only advertisement with the priority rank "B", and Advertisement C is now the only advertisement with the priority rank "C". As a result, the aerial image of new Advertisement A is formed alone at Position P1 closest to the observer, the aerial image of Advertisement B is formed alone at Position P2 next closest to the observer, and the aerial image of Advertisement C is formed alone at Position P3 farthest from the observer.

If there are plural new advertisements, the corresponding aerial images are formed at Position P1 closest to the observer in the manner as illustrated in FIGS. 8A to 8C.

Example 7

Figure 12A:
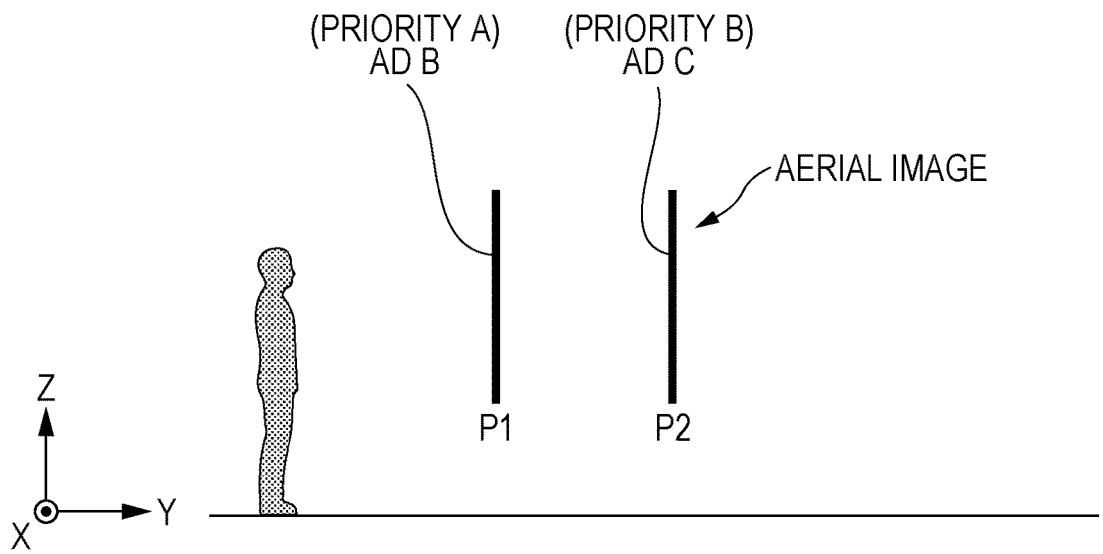
Figure 12B:
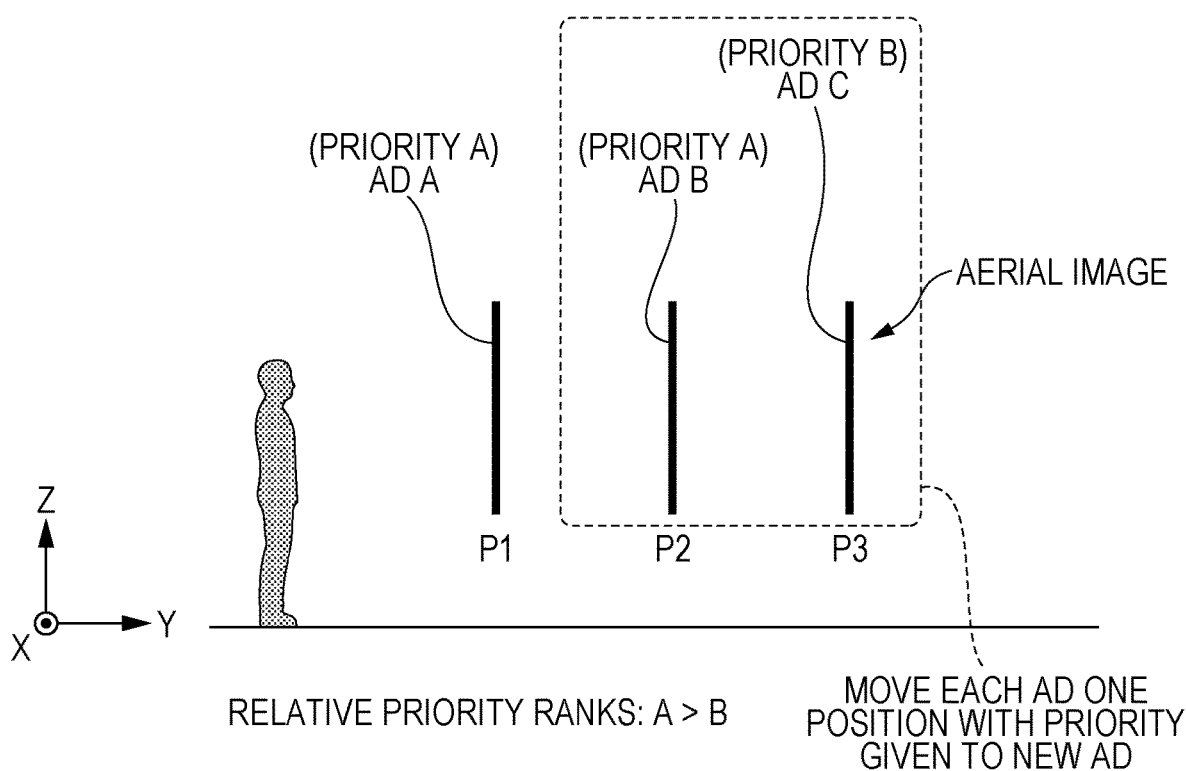

FIGS. 12A and 12B each illustrate another exemplary process performed if placement of a new advertisement is to be started. FIG. 12A illustrates a state before placement of Advertisement A as a new advertisement is started, and FIG. 12B illustrates a state after placement of Advertisement A as a new advertisement is started.

In the case of Example 6 mentioned above, if a new advertisement, Advertisement A, is to be placed, the priority rank of each already-placed advertisement is lowered by one to ensure that only the aerial image corresponding to the new advertisement be formed at Position P1 closest to the observer. Alternatively, it is also possible to employ a method that changes where an aerial image is formed without changing its priority rank.

In the case of FIGS. 12A and 12B, the state before placement of a new advertisement is started is the same as that in FIGS. 11A and 11B. That is, the aerial image of Advertisement B with the priority rank "A" is formed at Position P1, and the aerial image of Advertisement C with the priority rank "B" is formed at Position P2.

In the case of FIG. 12B, the placement of Advertisement A with the priority rank "A" has been started. In this state, the priority rank of Advertisement B remains to be "A", and the priority rank of Advertisement C remains to be "B". However, in the case of FIGS. 12A and 12B, the fact that a new advertisement placement is to be started is given precedence over priority rank. Accordingly, the aerial image of Advertisement A, which is the advertisement whose placement is to be newly started, is assigned to Position P1 closest to the observer, and the positions at which to form the respective aerial images of the existing advertisements, Advertisements B and C, are each moved one position to the far side.

Although the placement of advertisements illustrated in FIGS. 12A and 12B is the same as the placement of advertisements illustrated in FIGS. 11A and 11B, the process executed by the processor 21 (see FIG. 1) differs from that in FIGS. 11A and 11B.

Example 8

Figure 13:
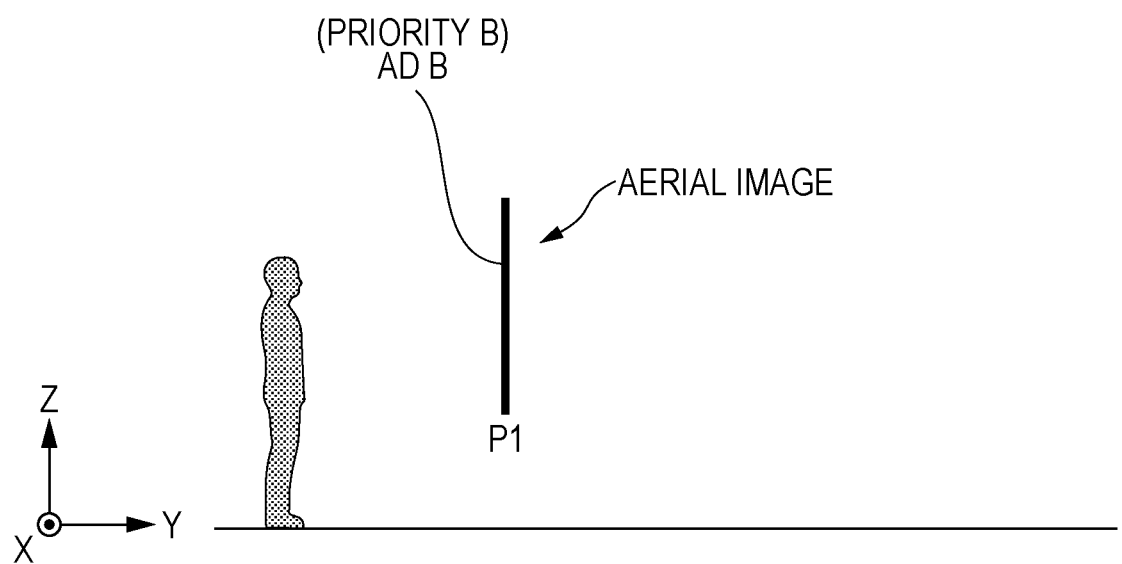
FIG. 13 illustrates an exemplary process performed if only one aerial image is to be formed in the air.

FIG. 13 illustrates an exemplary process performed if only one aerial image is to be formed in the air.

In the case of the examples above, an aerial image for advertising is basically formed at a position that has a one-to-one correspondence with its priority rank. Now, in Example 8, an exception to this configuration will be described.

In the case of FIG. 13, only the aerial image of Advertisement B with the priority rank "B" is formed in the air. In this case, it is possible to form the aerial image of Advertisement B at Position P2 in accordance with its priority rank as illustrated in FIG. 5B.

In this regard, however, one may think that in the absence of any other aerial image formed, it is unnecessary to move Advertisement B to Position P2 farther away from the observer.

Accordingly, in the case of FIG. 13, the aerial image of Advertisement B with the priority rank "B" is formed at Position P1, which is otherwise the position where an advertisement with the priority rank "A" is placed.

Example 9

Figure 14A:
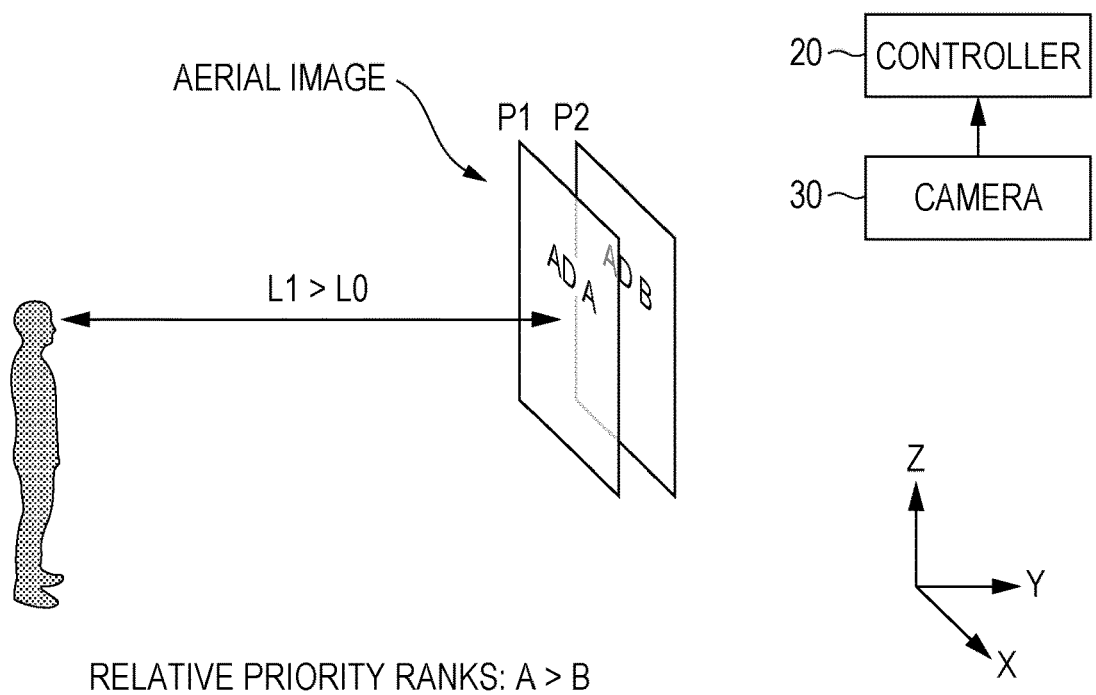
Figure 14B:
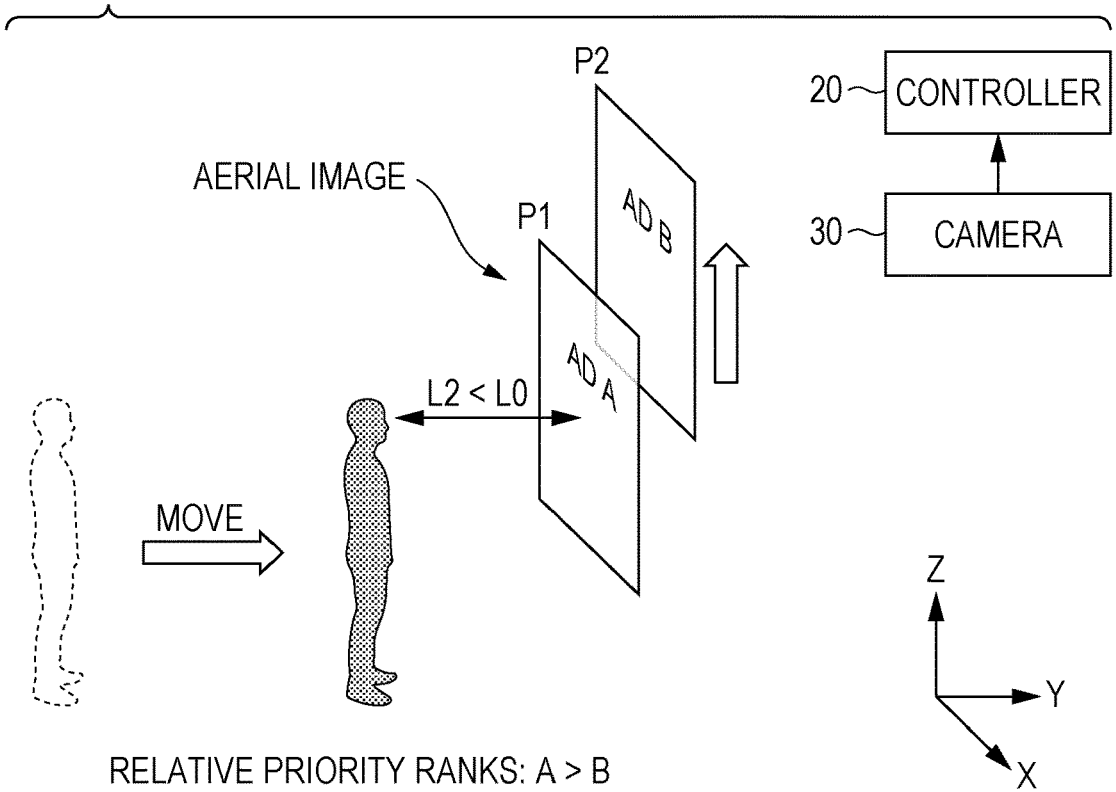

FIGS. 14A and 14B each illustrate another example of how to position aerial images formed at plural positions in the depth direction. FIG. 14A illustrates how the aerial images are positioned relative to each other if the distance L1 between a person and Position P1 is greater than a threshold L0, and FIG. 14B illustrates how the aerial images are positioned relative to each other if the distance L2 between the person and Position P1 is less than the threshold L0.

In other words, Example 9 represents an example in which each aerial image is formed at a position that changes with the movement of a person.

In the case of FIGS. 14A and 14B, the aerial image of Advertisement A is formed at Position P1, and the aerial image of Advertisement B is formed at Position P2. The aerial image of Advertisement A and the aerial image of Advertisement B have the same size.

In the case of FIG. 14A, the position where the aerial image of Advertisement A is formed, and the position where the aerial image of Advertisement B is formed differ from each other only in their coordinate value with respect to the direction of the Y-axis.

In the case of FIG. 14A, the distance L1 between the person and Position P1 is greater than the threshold L0, which is a predetermined threshold. In this case, the processor 21 of the controller 20 (see FIG. 1) maintains the relative positioning of each aerial image. In the exemplary embodiment, the distance between the person and Position P1 is estimated based on an image captured by the camera 30. That is, the distance in this case may not be strictly exact.

In the case of FIG. 14B, the distance L2 between the person and Position P1 is less than the predetermined threshold L0. In this case, the processor 21 regards the person as having approached the advertisement with interest. That is, a person who has approached an aerial image by more than the threshold L0 is an example of a person who has taken an interest in an aerial image.

In the example in FIG. 14B, to ensure that not only Advertisement A but also Advertisement B can be easily observed, the aerial image corresponding to Advertisement B is moved upwards, that is, in the Z-axis direction. In this case, the aerial image corresponding to Advertisement B is no longer positioned behind the aerial image corresponding to Advertisement A. As a result, although in FIG. 14A the aerial image corresponding to Advertisement B can be observed only through the aerial image corresponding to Advertisement A formed in front of Advertisement B, the aerial image corresponding to Advertisement B may be now observed directly. That is, in the case of FIG. 14B, a person may be able to directly observe both the aerial image corresponding to Advertisement A and the aerial image corresponding to Advertisement B.

In this case, the aerial image corresponding to Advertisement B remains to be formed at the same position, Position P2, in the depth direction.

Figure 15A:
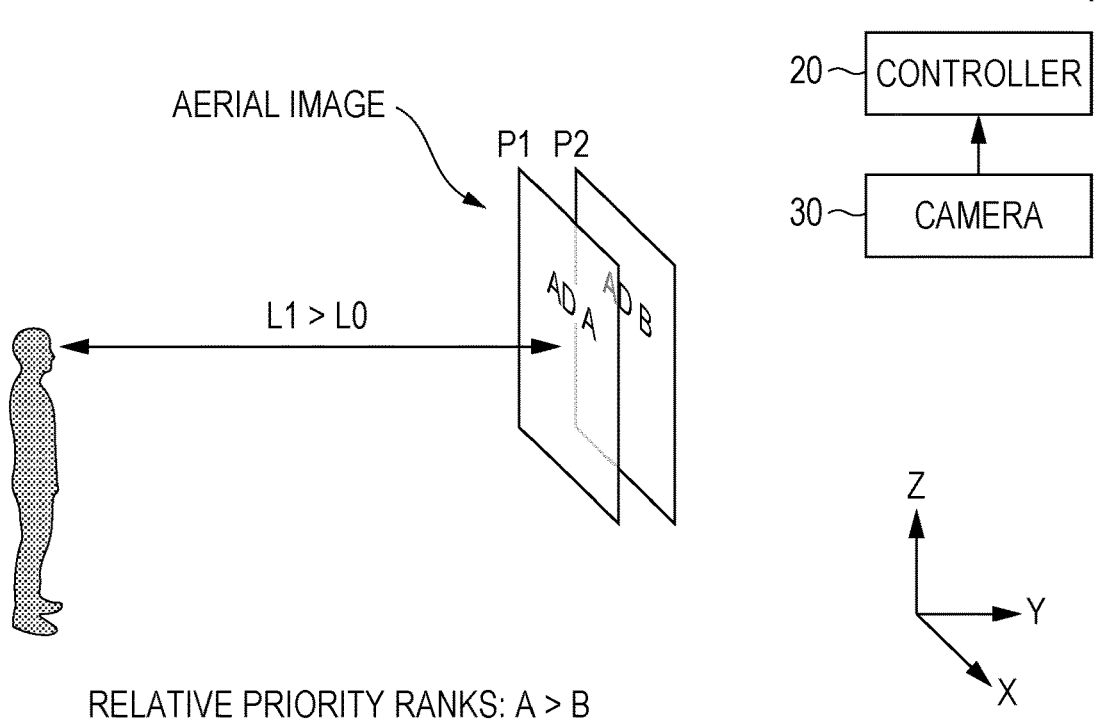
Figure 15B:
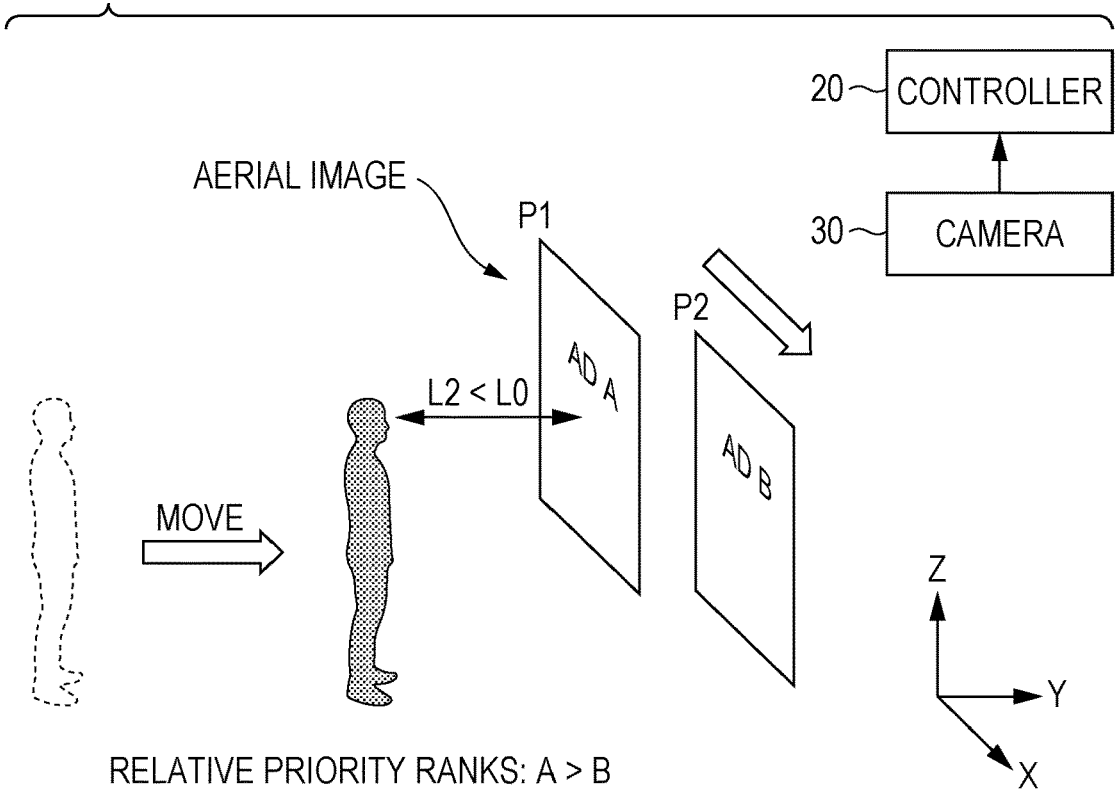

FIGS. 15A and 15B each illustrate another example of how to position aerial images formed at plural positions in the depth direction. FIG. 15A illustrates how the aerial images are positioned relative to each other if the distance L1 between a person and Position P1 is greater than the threshold L0, and FIG. 15B illustrates how the aerial images are positioned relative to each other if the distance L2 between the person and Position P1 is less than the threshold L0.

In FIGS. 15A and 15B, features corresponding to those in FIGS. 14A and 14B are denoted by the corresponding reference signs.

In the case of FIGS. 14A and 14B mentioned above, as a person approaches an advertisement, the aerial image of Advertisement B on the far side is moved upward, that is, in the Z-axis direction. In the case of FIGS. 15A and 15B, the aerial image of Advertisement B is moved in the X-axis direction. In the case of FIGS. 15A and 15B, the aerial image of Advertisement B is moved to the right-hand side as seen from the person in FIGS. 15A and 15B. Of course, it is also possible to move the aerial image of Advertisement B to the left-hand side as seen from the person in FIGS. 15A and 15B.

Although the aerial image is moved in a different direction in this case, this also facilitates the observation of the advertisement by the person.

Example 10

Figure 16A:
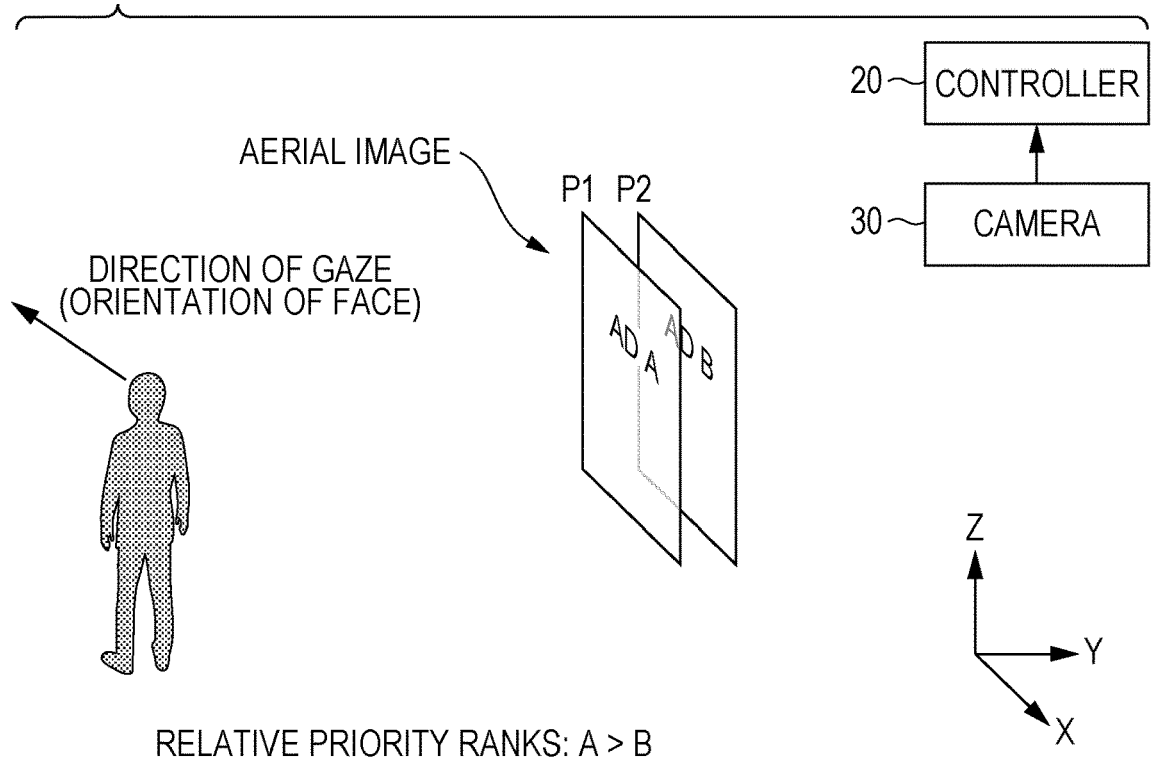
Figure 16B:
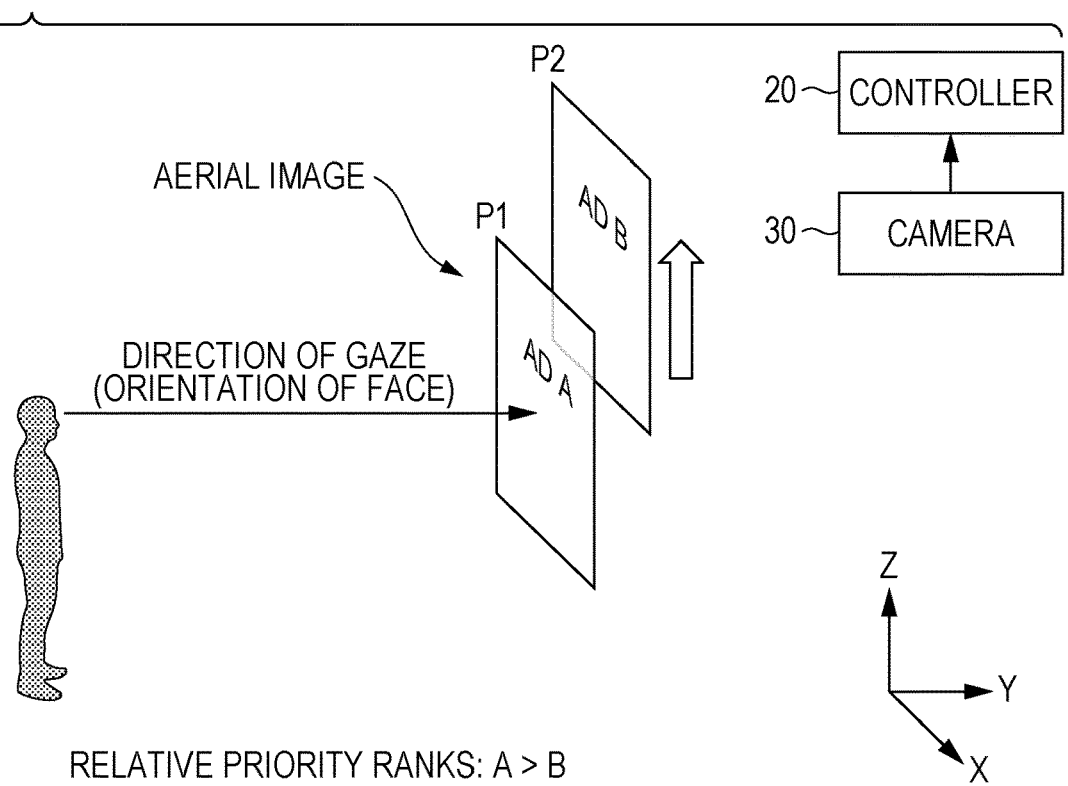

FIGS. 16A and 16B each illustrate another example of how to position aerial images formed at plural positions in the depth direction. FIG. 16A illustrates an example in which a person is not looking in the direction of an aerial image, and FIG. 16B illustrates an example in which the person is looking in the direction of the aerial image. In FIGS. 16A and 16B, features corresponding to those in FIGS. 14A and 14B are denoted by the corresponding reference signs.

In the case of FIGS. 16A and 16B, an image captured by the camera 30 is processed by the processor 21 of the controller 20 (see FIG. 1) to estimate the direction of gaze of a person present in the vicinity of an aerial image. In other words, the processor 21 determines whether the person's face is directed toward the aerial image. The processor 21 in this case determines whether the direction of the person's gaze falls within a predetermined directional range.

For example, the processor 21 acquires information such as Positions P1 and P2 where aerial images are formed, and the size and height position of each aerial image, estimates a range of area where each aerial image is formed in the air, and determines whether the estimated direction of gaze overlaps the estimated range of area. It is to be noted, however, that the range of area where an aerial image is formed may not be estimated but may be given in advance. Alternatively, for example, the processor 21 may determine whether Positions P1 and P2 fall within a predetermined angular range with respect to the estimated direction of gaze.

In the case of FIG. 16A, the person's gaze is not directed toward an aerial image. In this case, the processor 21 maintains the relative positioning of each aerial image.

In the case of FIG. 16B, the person's gaze is directed toward the aerial image. In this case, the processor 21 regards the person as being interested in the advertisement, and moves the aerial image corresponding to Advertisement B upward to ensure that the person can easily observe not only Advertisement A but also Advertisement B. The person in this case is also an example of a person who has taken an interest in an aerial image.

As with the example in FIGS. 15A and 15B, the aerial image of Advertisement B may be moved to the right-hand side as seen from the person in FIGS. 16A and 16B. Of course, it is also possible to move the aerial image of Advertisement B to the left-hand side as seen from the person in FIGS. 16A and 16B.

Even when it is determined that a person's gaze is directed toward an aerial image, if the person and the aerial image are far too away from each other, it is difficult for the person to see what the advertisement presented as an aerial image advertises. Accordingly, the range to be captured by the camera 30 may be such a range that allows a person to see what the advertisement presented as an aerial image advertises. Alternatively, the above-mentioned technique may be used in combination with the technique according to Example 9. That is, Advertisement B may be moved outward from behind Advertisement A to increase its visibility only if both the condition regarding the direction of gaze and the condition regarding the distance between a person and an aerial image, rather than only the condition regarding the direction of gaze, are satisfied.

In Examples 9 and 10, Advertisement B on the far side is moved such that Advertisement B on the far side is not observed to be overlapping Advertisement A located on the near side. Alternatively, it may be possible to move Advertisement A located on the near side while keeping Advertisement B on the far side fixed in position.

Further, to increase the visibility of Advertisement A, Advertisement A may be enlarged, or Advertisement A may be increased in brightness or chromaticity.

Example 11

Figure 17A:
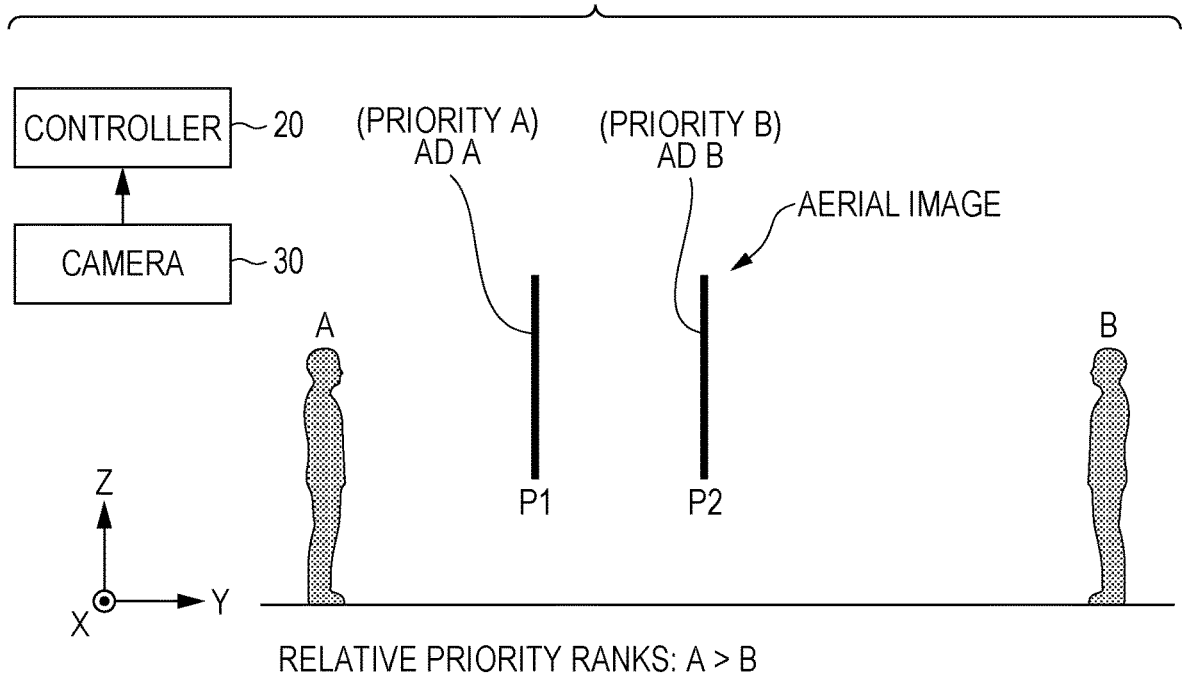
Figure 17B:
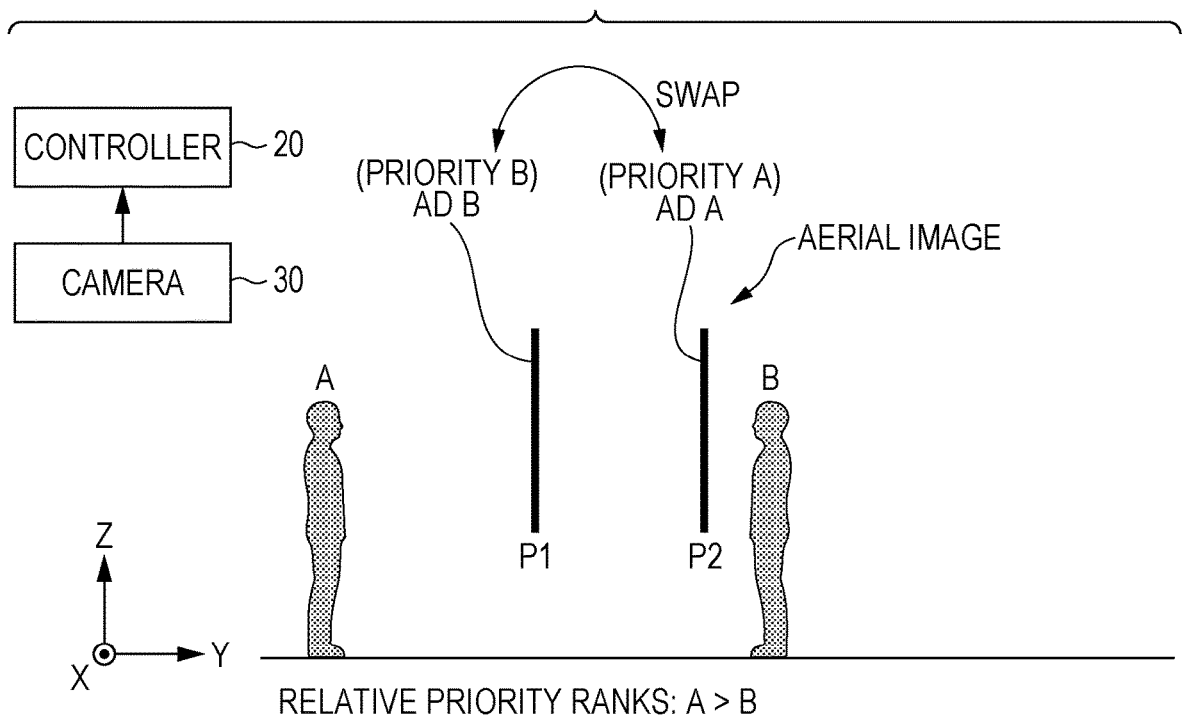

FIGS. 17A and 17B each illustrate an example of how to position aerial images that are formed at plural positions in the depth direction and can be observed from both the front and back sides. FIG. 17A illustrates how the aerial images are formed if the distance between Person A and Position P1 is less than the distance between Person B and Position P2, and FIG. 17B illustrates how the aerial images are formed if the distance between Person B and Position P2 is less than the distance between Person A and Position P1.

In this case as well, an image captured by the camera 30 is processed by the processor 21 of the controller 20 (see FIG. 1) to estimate the distance between Person A and Position P1 where Advertisement A is formed, and the distance between Person B and Position P2 where Advertisement B is formed.

As illustrated in FIGS. 17A and 17B, Advertisement A has the priority "A", and Advertisement B has the priority "B". Thus, in the case of FIG. 17A, Advertisement A with a high priority is formed on the near side as seen from Person A, and Advertisement B with a comparatively low priority is formed on the far side as seen from Person A. In other words, as seen from Person B, Advertisement B is formed on the near side, and Advertisement A is formed on the far side.

In the case of FIG. 17B, Person B is located closer to an aerial image than Person A is. In this case, the reference position regarding priority moves to Person B. Thus, in the case of FIG. 17B, Advertisement A with a high priority is formed on the near side to Person B, and Advertisement B with a comparatively low priority is formed on the far side from Person B. In other words, as seen from Person A, Advertisement B is formed on the near side, and Advertisement A is formed on the far side.

Although Person A and Person B are depicted in FIGS. 17A and 17B as facing each other with aerial images therebetween, their positions may be shifted relative to each other in the X-axis direction. This is because in the case of FIGS. 17A and 17B, the only precondition is that Person A and Person B be on the opposite side of each other with Advertisement A and Advertisement B therebetween.

Example 12

Figure 18A:
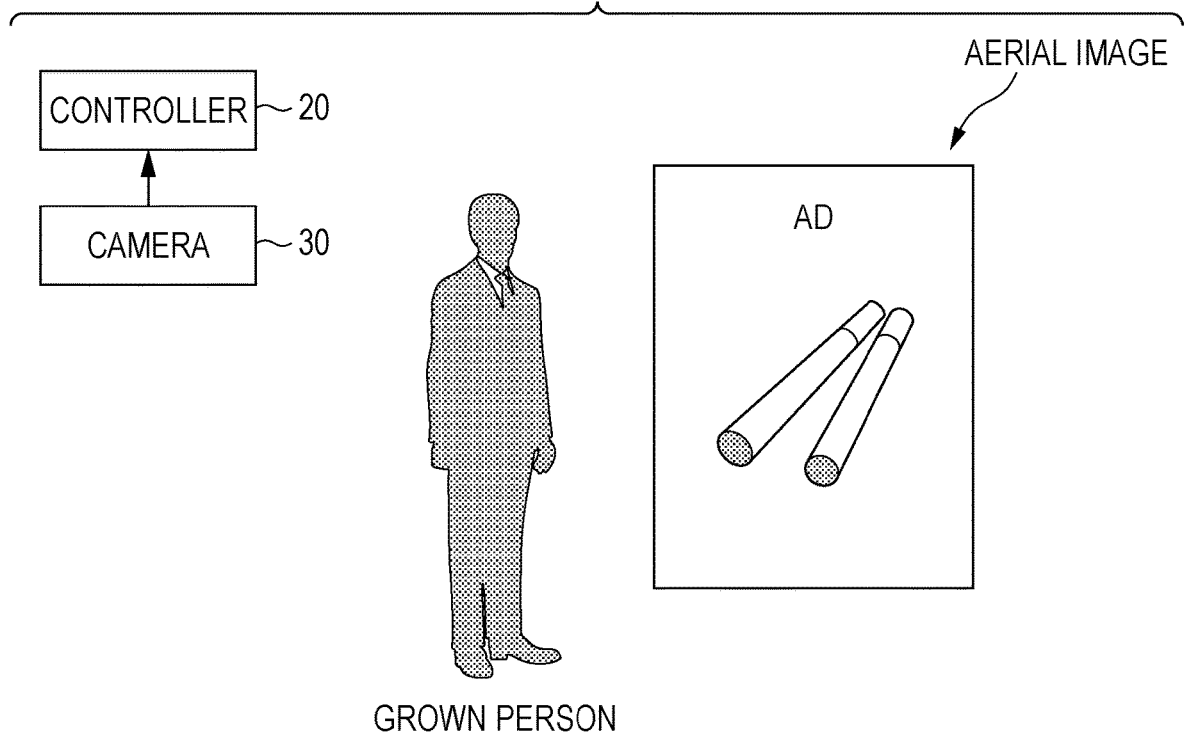
Figure 18B:
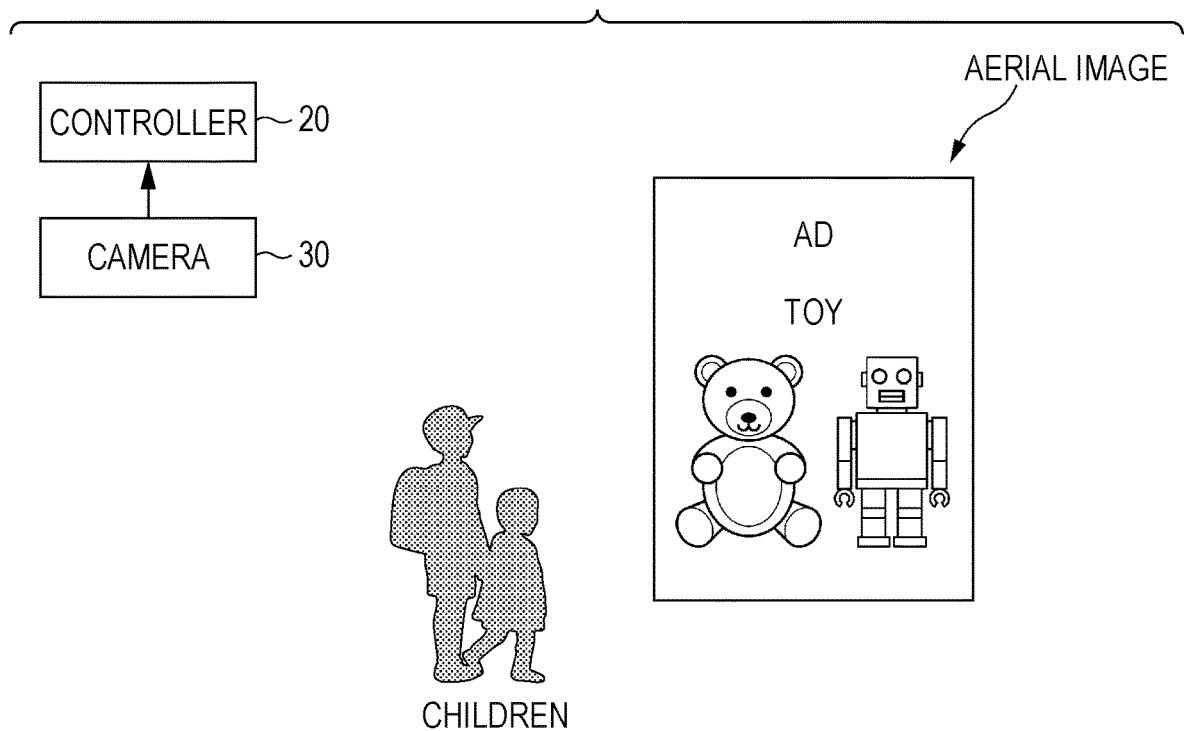

FIGS. 18A and 18B each illustrate an example in which what an advertisement formed as an aerial image advertises is changed by using, as information that is given precedence over priority, an attribute of a person who sees the aerial image. FIG. 18A illustrates an example in which the person is a grown person, and FIG. 18B illustrates an example in which such persons are children.

In the case of this example, an image captured by the camera 30 is processed by the processor 21 of the controller 20 (see FIG. 1) to estimate a person's attribute. A person's attribute in Example 12 is assumed to be information that can be estimated from the person's appearance. Examples of attributes in this case include sex, age group, and also information as to whether each person is a member of a group such as a family or couple. In this case, an attribute is estimated based on image processing, and thus may not necessarily be determined exactly in a strict sense. As will be descried later, exact determination of an attribute in a strict sense is performed through communication with an information terminal carried by a person.

In FIG. 18A, a person who sees an aerial image is a grown person, and thus an aerial image for advertising cigarettes is formed. For cigarette advertisements, "grown persons" are indeed registered as target audience. It is difficult to estimate whether a person is an adult in the legal sense based on information about the person's appearance alone. Accordingly, the criterion used in the exemplary embodiment is whether the person of interest is a grown person. In this regard, in what case a person is determined to be a grown person may vary depending on what an advertisement advertises. For example, if the advertisement advertises cigarettes, a case where a person is determined to be a grown person may be defined as when the person seeing an aerial image is not estimated to be a child. The same applies to advertisements for alcohols.

In FIG. 18B, each person who sees an aerial image is a child, and thus an aerial image for advertising a toy is formed. Even if the cigarette advertisement has the priority rank "A", if a person who sees an aerial image is estimated to be a child, then the output of the cigarette advertisement is stopped, and what advertisement to present is determined in relation to the child.

For toy advertisements themselves, not only children but also persons such as parents or grand parents are registered as their target audience.

Example 13

Figure 19:
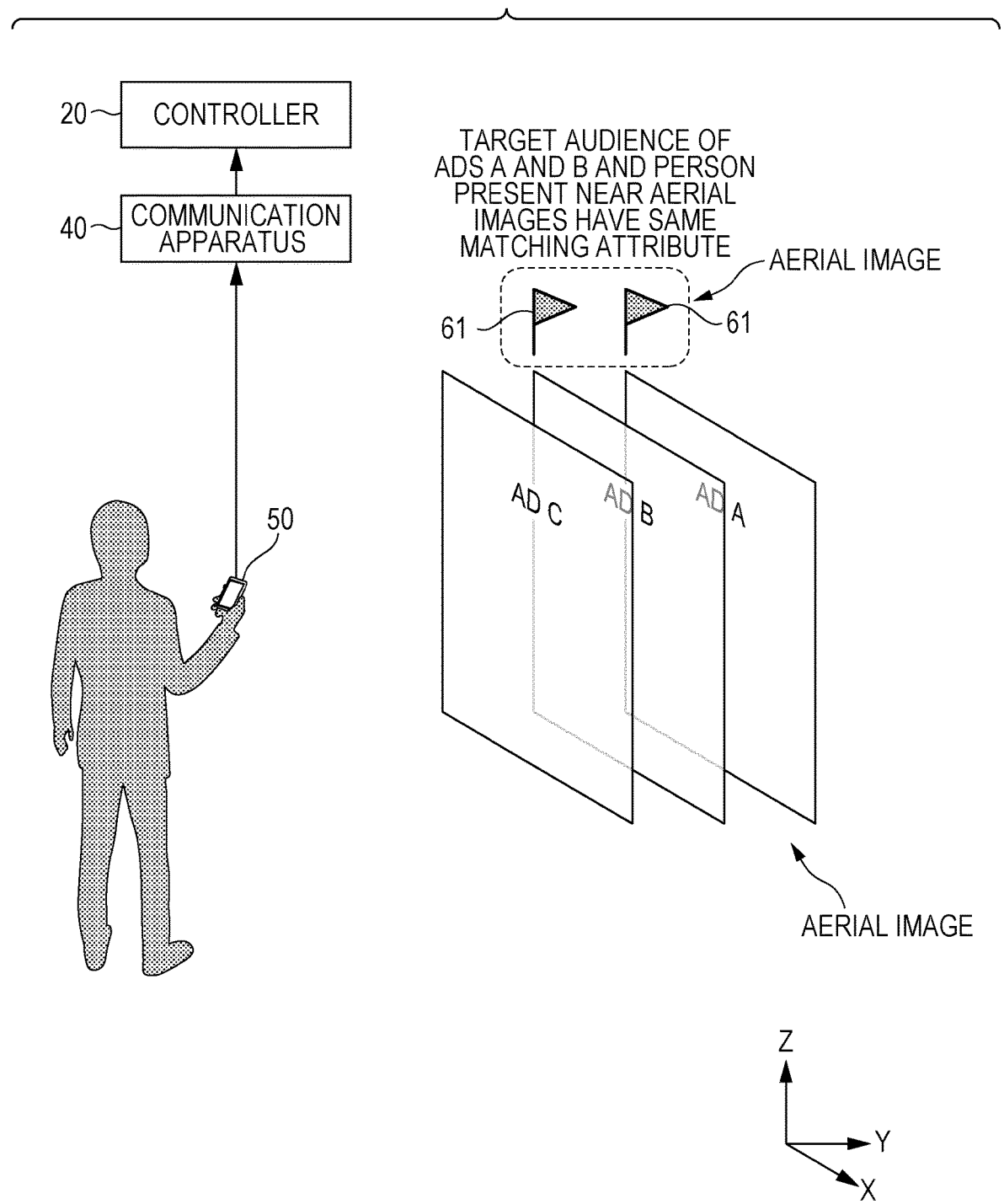
FIG. 19 illustrates an example in which an attention-drawing aerial image is additionally formed by using, in precedence over priority, an attribute of a person who sees an aerial image.

FIG. 19 illustrates an example in which an attention-drawing aerial image is additionally formed by using, in precedence over priority, an attribute of a person who sees an aerial image.

In the case of FIG. 19, the communication apparatus 40 constituting the information processing system 1 communicates with an information terminal 50 carried by a person present near an aerial image to thereby acquire account information on the information terminal 50. The processor 21 of the controller 20 (see FIG. 1) acquires an attribute associated with the account from a database (not illustrated) or a server (not illustrated). Information of an attribute associated with such an account may be concealed to prevent identification of an individual. For example, age may be given in the form of a rough age group such as 10s or 20s.

In the example in FIG. 19, the aerial image corresponding to Advertisement C is located closest to the person, the aerial image corresponding to Advertisement B is formed behind this image, and the aerial image corresponding to Advertisement A is formed further behind.

In this case, Advertisement A and Advertisement B are located behind Advertisement C, and thus less likely to be noticed. In this example, however, the target audience of Advertisements A and B and the person present near their aerial images have the same matching attribute. Thus, an aerial image in the shape of a flag 61 is formed near each of the respective aerial images of Advertisements A and B. The position of the flag 61 illustrated in FIG. 19 is an example of a position not overlapping the area behind Advertisement C. In the case of FIG. 19, the flag 61 is formed above each of the aerial image corresponding to Advertisement A and the aerial image corresponding to Advertisement B. This is to ensure that the flag 61 readily catches the notice of the observer. In other words, the flag 61 is an example of a flag that draws attention. A person seeing the flag 61 becomes readily aware that an aerial image of an advertisement targeted to the person exists.

Example 14

Figure 20:
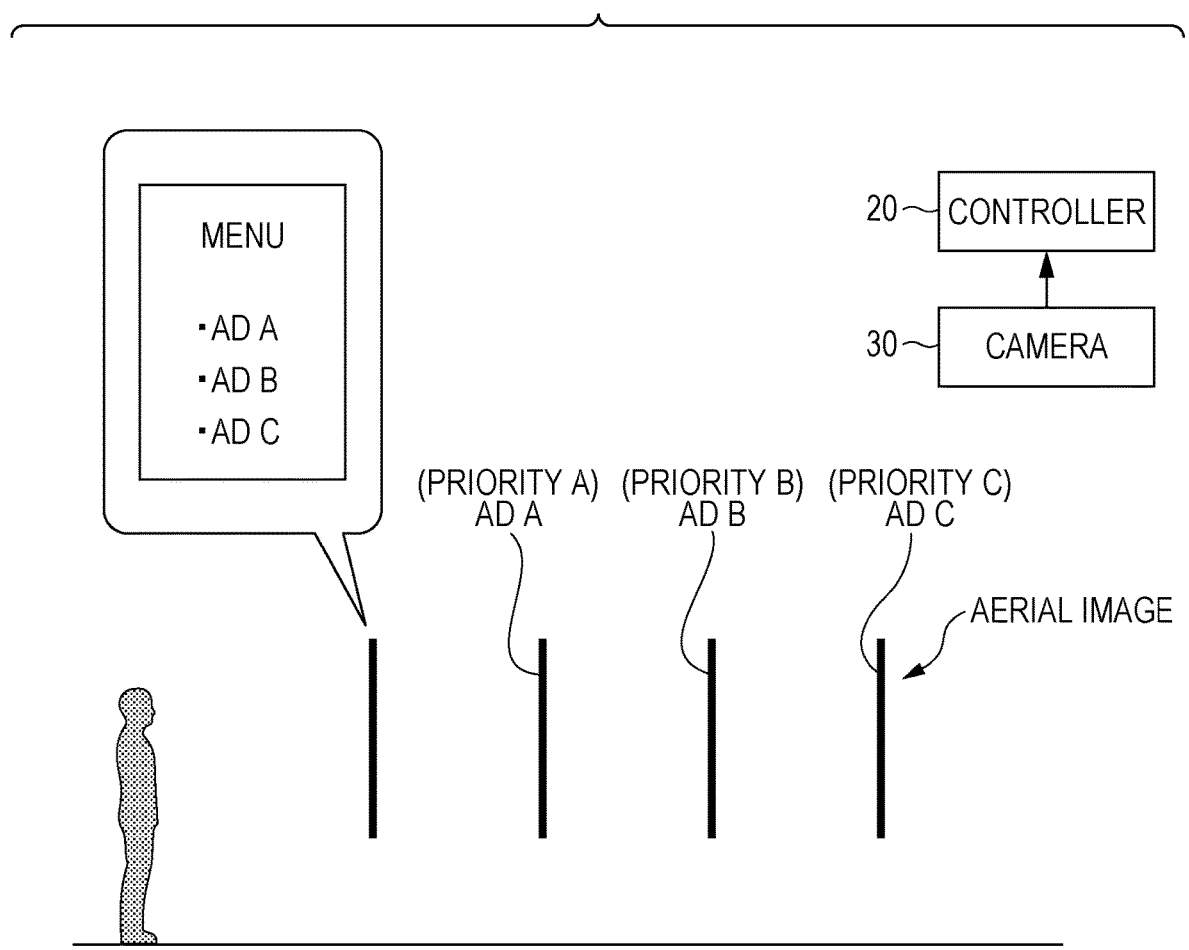
FIG. 20 illustrates an example of how, in arranging aerial images corresponding to plural advertisements in the depth direction, an aerial image that aids in seeing information about the advertisements located behind the aerial image is formed.

FIG. 20 illustrates an example of how, in arranging aerial images corresponding to plural advertisements in the depth direction, an aerial image that aids in seeing information about the advertisements located behind the aerial image is formed.

In the case of FIG. 20, three aerial images corresponding to Advertisements A, B, and C are formed in the air. Advertisement A has the priority rank "A", Advertisement B has the priority rank "B", and Advertisement C has the priority rank "C". Thus, of the three aerial images, the aerial image corresponding to Advertisement A is formed at the position closest to a person, the aerial image corresponding to Advertisement B is formed at the second closest position to the person, and the aerial image corresponding to Advertisement C is formed at the position farthest from the person.

In the case of FIG. 20, an aerial image corresponding to a menu screen is formed nearer the person than are the advertisement images corresponding to the three advertisements.

The menu screen is an example of a specific content item. The priority rank of the specific content item is "A", and set higher than the priority of any advertisement. Thus, the menu screen is formed at the foremost position as seen from the person.

The menu screen illustrated in FIG. 20 shows information such as a title describing what each aerial image formed behind the menu screen advertises. In the case of FIG. 20, the respective titles of Advertisements A, B, and C are listed in this order from bottom to top on the menu screen.

In the case of this example, an operation performed by a person on the menu screen is captured as an image by the camera 30, and the captured image is processed by the processor 21 of the controller 20 (see FIG. 1). For example, the processor 21 forms, at the position closest to a person, an aerial image corresponding to the title selected by the person.

FIG. 21 illustrates how an aerial image changes in response to receiving a person's operation on the menu screen.

In the case of FIG. 21, based on an image captured by the camera 30 (see FIG. 20), the processor 21 recognizes that Advertisement B has been selected by the user with the user's fingertip, and the processor 21 thus forms, in the air, an aerial image corresponding to Advertisement B selected by the person.

With the method illustrated in FIG. 21, even if the number of aerial images arranged on the far side as seen from a person increases, an aerial image corresponding to an advertisement that draws the interest or attention of the person seeing the aerial image may be formed on the near side. In other words, even for an advertisement whose aerial image is otherwise formed at a position not readily noticeable by a person if aerial images are arranged according to their priority, such an advertisement may be presented at the foremost position to a person interested in the advertisement.

Example 15

FIG. 22 illustrates an example of how aerial images are formed by using the above-mentioned examples in a combined manner.

In the case of FIG. 22, Advertisement A is placed during the period from time T1 to T2, Advertisement B is placed during the period from time T2 to T3, Advertisement C is placed during the period from time T3 to T6, Advertisement D is placed at time T4, Advertisement E is placed at time T4, and Advertisement F is placed during the period from time T4 to T7.

First, at time T1, only the aerial image of Advertisement A is placed. Thus, the aerial image of Advertisement A is formed alone in the air. The size of the aerial image of Advertisement A at time T1 will be referred to as reference size.

At time T2, Advertisement A and Advertisement B are placed. In the examples above, the priority of an advertisement is set to "A" on the placement start date/time and the placement end date/time. By contrast, the example illustrated in FIG. 22 employs a method that gives precedence to Advertisement B whose placement is to be newly started, over Advertisement A that is being currently placed. Thus, the aerial image of Advertisement A is formed behind the aerial image of Advertisement B. Further, the aerial image of Advertisement A is controlled to have a size smaller than the size of the aerial image of Advertisement B.

At time T3, Advertisement B and Advertisement C are placed. At time T3, aerial images may be formed in the same manner as at time T2. The formation of aerial images at time T3 differs from that at time T2 in the size at which Advertisement B is formed behind Advertisement C, which is the advertisement whose placement is to be newly started. At time T3, the aerial image corresponding to Advertisement B and the aerial image corresponding to Advertisement C are formed at the same size.

At time T4, four advertisements, Advertisements C, D, E, and F, are placed. At time T4, the aerial images corresponding to the three advertisements whose placement is to be newly started, namely Advertisements D, E, and F, are formed in front of the aerial image of Advertisement C whose placement has already been started. It is to be noted, however, that due to information other than priority, the aerial image of Advertisement D has a size that is one-half of the reference size, and the respective aerial images of Advertisements E and F have a size that is one-quarter of the reference size. Further, the aerial image of Advertisement D is located in the upper half, and the respective aerial images of Advertisements E and F are located in the lower half. In this case, the sizes of Advertisements D, E, and F, or their positions within the image plane are set in accordance with the relative relationship between these advertisements.

Example 16

In the examples above, whether a person has seen an aerial image does not affect where the aerial image is formed. That is, even when a person has not seen an aerial image, the aerial image is formed at a position corresponding to its priority.

The following describes an example in which the position at which to form an aerial image is linked to whether the aerial image has been seen by a person.

Figure 23A:
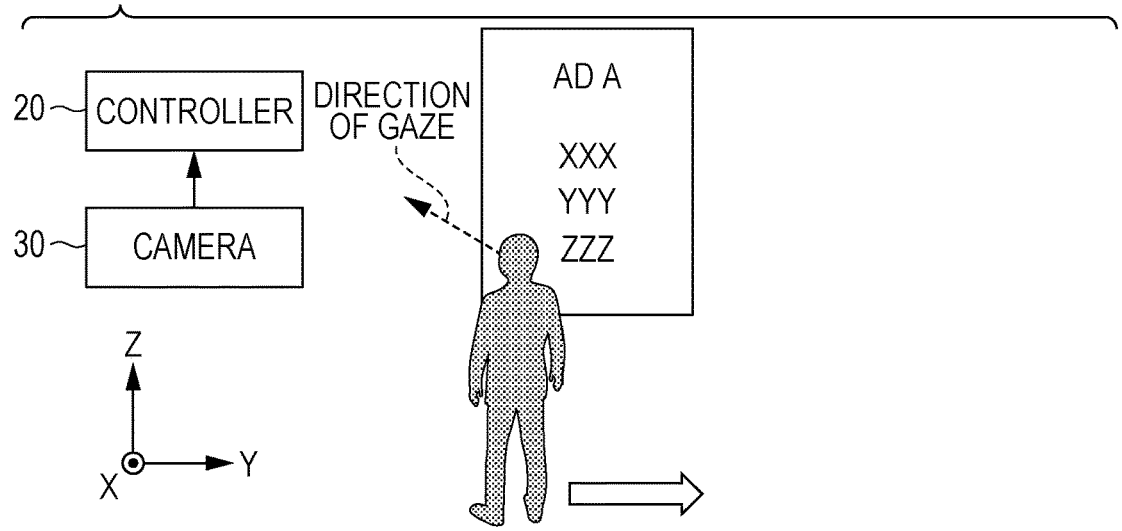
Figure 23B:
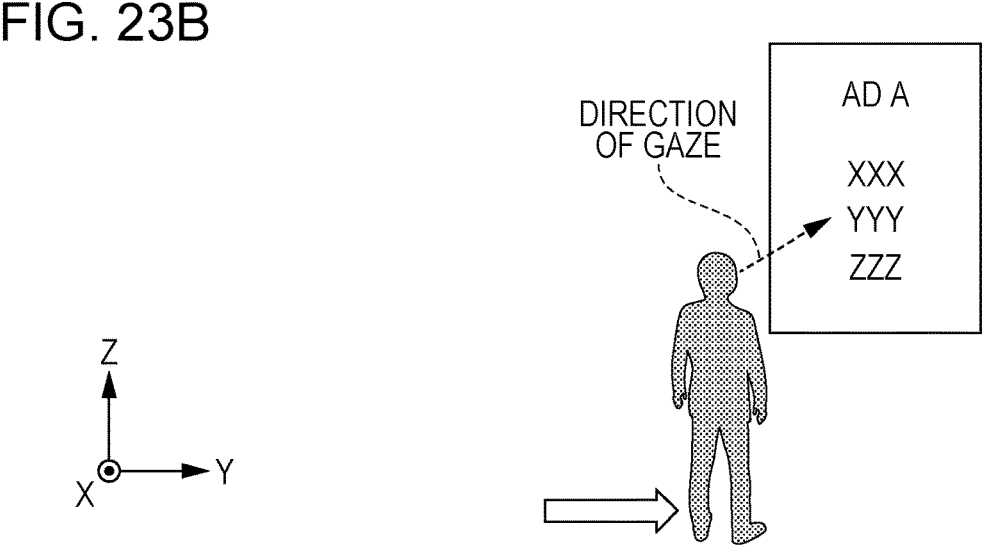
Figure 23C:
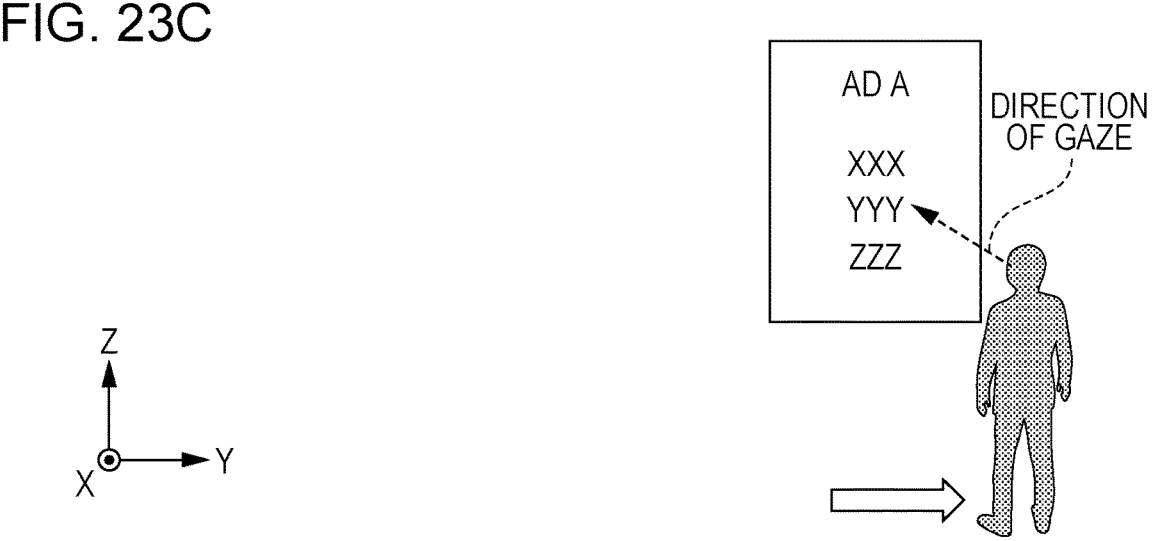

FIGS. 23A to 23C each illustrate the relationship between whether an aerial image has been seen by a person present near the aerial image, and where the aerial image is formed. FIG. 23A illustrates a state in which the person is present near an aerial image but has not seen the aerial image, FIG. 23B illustrates a state in which the person has seen the aerial image while moving, and FIG. 23C illustrates a state in which the person continues moving even after confirmed to have seen the aerial image.

In the case of FIGS. 23A to 23C, the camera 30 captures an image of the person present in the vicinity of the aerial image, and the processor 21 of the controller 20 (see FIG. 1), which processes the captured image, estimates the direction of the person's gaze.

In the case of FIG. 23A, the person's gaze is not directed toward the position where Advertisement A is formed as an aerial image. Thus, as the person moves, the position at which to form the aerial image is also moved following the person's movement. This movement of the aerial image is performed for the purpose of making the person notice the aerial image. This is because if the aerial image continues to be formed at a fixed position even through the person who is moving has not yet noticed the aerial image, the distance between the aerial image and the person only keeps increasing, leading to reduced possibility of the aerial image being noticed.

In this regard, however, if the aerial image is also moved in the direction of the person's movement as illustrated in FIG. 23B, the distance between the person and the aerial image does not increase. This may increase the chance of the person noticing the aerial image at the time when the person changes the direction of gaze. In FIG. 23B, the person's gaze is directed toward the aerial image. In this case, the controller 20 detects that the aerial image has been seen by the person.

In the case of FIG. 23C, although the person continues moving, the aerial image is fixed at the position where the aerial image is located at the time when the seeing of the aerial image by the person has been detected. In the case of FIG. 23C, while the person continues to direct his or her gaze toward the aerial image corresponding to Advertisement A, the aerial image is kept at the same position. This is because the person has already noticed the aerial image and thus has had the chance of checking what the aerial image is.

It is also possible, however, to move the aerial image following the person's movement if the person's gaze is directed toward the aerial image.

Example 17

Figure 24A:
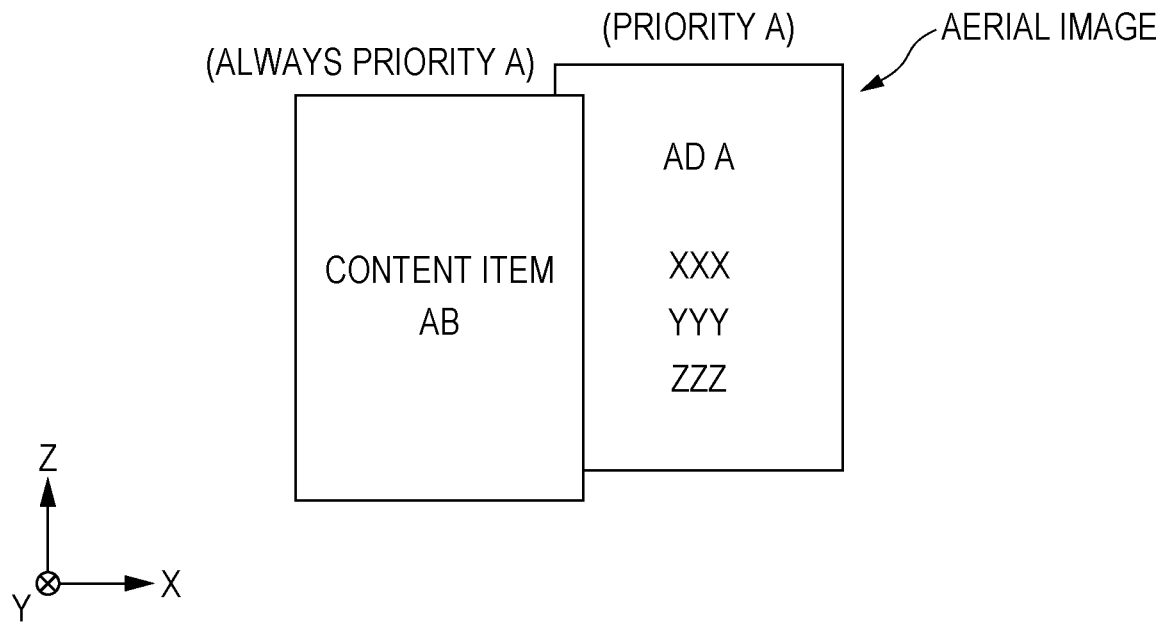
Figure 24B:
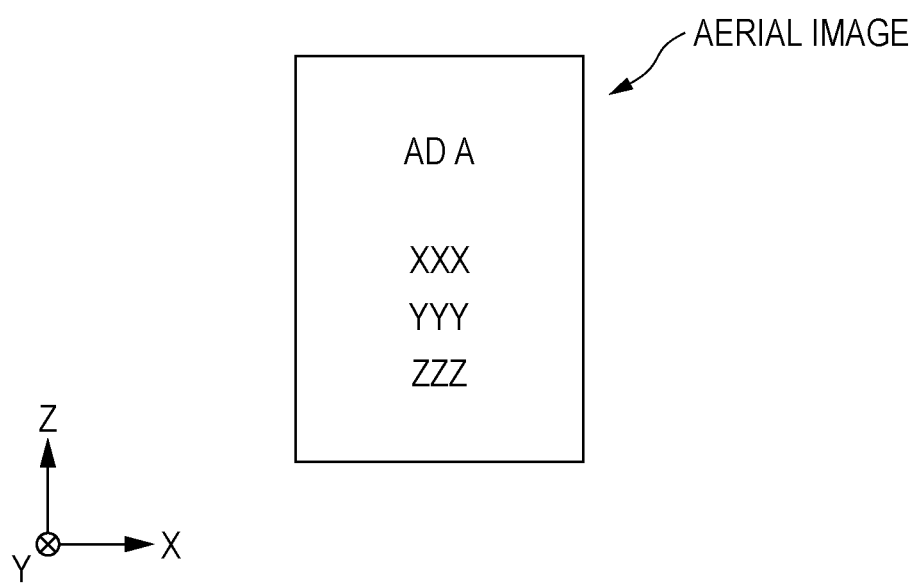

FIGS. 24A and 24B each illustrate how an aerial image corresponding to a content item, and an aerial image corresponding to an advertisement are positioned relative to each other. FIG. 24A illustrates an exemplary case in which an aerial image corresponding to a content item and an aerial image corresponding to an advertisement are formed simultaneously, and FIG. 24B illustrates an exemplary case in which the formation of the aerial image corresponding to the content item is stopped.

In the case of FIGS. 24A and 24B, the content item is Content Item AB, and the advertisement is Advertisement A. Content Item AB has the priority rank "A" at all times, and in the state as illustrated in FIGS. 24A and 24B, Advertisement A has the priority rank "A".

In the case of the above-mentioned examples, content items are given precedence over advertisements. In this regard, however, if an aerial image corresponding to an advertisement is always formed behind an aerial image corresponding to a content item, this results in reduced visibility of the advertisement observed through the aerial image of the content item.

Accordingly, as illustrated in FIG. 24A, even when an aerial image corresponding to Content Item AB is being currently formed, the processor 21 (see FIG. 1) forms an aerial image corresponding to Advertisement A in the vicinity of the foremost position as seen from the person. Specifically, the aerial image corresponding to Advertisement A is formed such that the majority of the aerial image is located at a position not overlapping the area behind Content Item AB.

If the formation of Content Item AB is stopped, the processor 21 forms the aerial image corresponding to Advertisement A at the position where the aerial image of Content Item AB has been formed, thus increasing the visibility of Advertisement A.

Other Exemplary Embodiments

For example, although an exemplary embodiment of the present disclosure has been described above, the technical scope of the present disclosure is not limited to the above exemplary embodiment. It is apparent from the description of the claims that various modifications or improvements of the embodiment also fall within the technical scope of the present disclosure.

Although the aerial-image forming apparatus 10 (see FIG. 1) and the controller 20 (see FIG. 1) have been described in the above exemplary embodiment as being independent from each other, the aerial-image forming apparatus 10 and the controller 20 may be integrated with each other.

The controller 20 according to the above exemplary embodiment may be a so-called computer or an information terminal such as a smartphone, or may be a server installed on the Internet.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
an aerial-image forming apparatus that forms an aerial image in air;
a camera that captures an image of an area where the aerial image is formed in the air; and
a processor configured to:
communicate with the aerial-image forming apparatus and the camera via a network interface;
control, via the network interface, the aerial-image forming apparatus to change a position of the aerial image formed in the air in a depth direction in accordance with a priority of the aerial image;
control, via the network interface, the aerial-image forming apparatus to further change the position of the aerial image formed in the air in the depth direction in accordance with an operation of a user captured by the camera;
set a priority of another aerial image related to a specific content item to a maximum priority; and
during a period of time in which formation of the another aerial image related to the specific content item is stopped, control the aerial-image forming apparatus to form the aerial image at a foremost position in the depth direction,
wherein the processor is further configured to communicate with a communication apparatus via the network interface, the communication apparatus being used to communicate with a terminal carried by the user.

2. The information processing apparatus according to claim 1,
wherein the processor is configured to, if the aerial image comprises a plurality of advertisement images, control a position where each of the plurality of advertisement images is formed in the depth direction, in accordance with relative priorities of the plurality of advertisement images.

3. The information processing apparatus according to claim 2,
wherein the plurality of advertisement images comprise a higher-priority advertisement image and a lower-priority advertisement image, and
wherein the processor is configured to form the higher-priority advertisement image on a near side as seen from a person, and forms the lower-priority advertisement image on a far side as seen from the person.

4. The information processing apparatus according to claim 3, wherein the plurality of advertisement images comprise a new advertisement image to be newly formed, and an existing advertisement image being currently formed, and wherein the new advertisement image is set to have a higher priority than the existing advertisement image.

5. The information processing apparatus according to claim 4, wherein the processor is configured to, if the new advertisement image comprises a plurality of new advertisement images, control a size of each of the plurality of new advertisement images, in accordance with relative priorities of the plurality of new advertisement images.

6. The information processing apparatus according to claim 4, wherein the processor is configured to, if the new advertisement image comprises a plurality of new advertisement images, control positioning of the plurality of new advertisement images, in accordance with relative priorities of the plurality of new advertisement images.

7. The information processing apparatus according to claim 4, wherein the processor is configured to, if the new advertisement image comprises a plurality of new advertisement images, control relative positioning of the plurality of new advertisement images in the depth direction, in accordance with relative priorities of the plurality of new advertisement images.

8. The information processing apparatus according to claim 1, wherein the priority of the aerial image changes based on a predetermined rule.

9. The information processing apparatus according to claim 8, wherein the priority of the aerial image changes with elapse of time.

10. The information processing apparatus according to claim 9, wherein the priority of the aerial image becomes maximum on a last day of a placement period of the aerial image.

11. The information processing apparatus according to claim 1, wherein the priority of the aerial image is set in accordance with a priority specified in a contract with respect to placement of the aerial image.

12. The information processing apparatus according to claim 1, wherein the aerial image comprises a plurality of aerial images including a high-priority aerial image, and wherein the processor is configured to, if the plurality of aerial images can be observed from both front and back sides as seen from a person, position the high-priority aerial image on one of the front and back sides where a detected distance to a person is shorter.

13. The information processing apparatus according to claim 1, wherein the processor is configured to change the priority of the aerial image in accordance with a relationship between what the aerial image advertises and an attribute of a person.

14. The information processing apparatus according to claim 1, aerial image comprises a plurality of aerial images, the plurality of aerial images including a far-side aerial image and a near-side aerial image, the far-side aerial image being located on a far side as seen from a person, the near-side aerial image being located on a near side as seen from the person, and aerial images, move the far-side aerial image outward from behind the near-side aerial image.

15. The information processing apparatus according to claim 1, aerial image comprises a plurality of aerial images, the plurality of aerial images including a far-side aerial image and a near-side aerial image, the far-side aerial image being located on a far side as seen from a person, the near-side aerial image being located on a near side as seen from the person, and aerial images, move the far-side aerial image outward from behind the near-side aerial image.

16. The information processing apparatus according to claim 1, wherein the processor is configured to, if the aerial image comprises a plurality of aerial images, instruct that a flag be formed near at least one of the plurality of aerial images that satisfies a predetermined condition, the flag being used to draw attention.

17. The information processing apparatus according to claim 1, wherein the processor is configured to, if the aerial image comprises a plurality of aerial images, form a menu screen at a foremost position, the menu screen being related to what each of the plurality of aerial images advertises.

18. The information processing apparatus according to claim 17, wherein the processor is configured to move an aerial image that is selected on the menu screen, to a near side.

19. The information processing apparatus according to claim 1, wherein the processor is configured to control the aerial-image forming apparatus to form the aerial image in a vicinity of the foremost position even when the another aerial image related to the specific content item is being currently formed.

20. The information processing apparatus according to claim 1, wherein the processor is configured to, until it is detected by the camera that the aerial image has been observed by a person having a specific attribute, move a position where the aerial image is formed, in accordance with movement of the person.

21. A non-transitory computer readable medium storing a program causing a computer to execute a process, the process comprising:

controlling an aerial-image forming apparatus that forms an aerial image in air, to change a position of the aerial image formed in the air in a depth direction in accordance with a priority of the aerial image;

controlling the aerial-image forming apparatus to further change the position of the aerial image formed in the air in the depth direction in accordance with an operation of a user captured by a camera that captures an image of an area where the aerial image is formed in the air;

setting a priority of another aerial image related to a specific content item to a maximum priority; and during a period of time in which formation of the another aerial image related to the specific content item is stopped, controlling the aerial-image forming apparatus to form the aerial image at a foremost position in the depth direction, wherein the computer is configured to communicate with the aerial-image forming apparatus, the camera, and a communication apparatus via a network interface, the communication apparatus being used to communicate with a terminal carried by the user.

\* \* \* \* \*